(12) United States Patent
Xu et al.

(10) Patent No.: US 11,385,439 B2
(45) Date of Patent: Jul. 12, 2022

(54) OPTICAL IMAGING LENS SET

(71) Applicant: ZHEJIANG SUNNY OPTICAL CO., LTD., Ningbo Zhejiang (CN)

(72) Inventors: Biao Xu, Ningbo Zhejiang (CN); Kaiyuan Zhang, Ningbo Zhejiang (CN); Lin Huang, Ningbo Zhejiang (CN)

(73) Assignee: ZHEJIANG SUNNY OPTICAL CO., LTD., Zhejiang (CN)

(*) Notice: Subject to any disclaimer, the term of this patent is extended or adjusted under 35 U.S.C. 154(b) by 307 days.

(21) Appl. No.: 16/832,892

(22) Filed: Mar. 27, 2020

(65) Prior Publication Data

US 2020/0225451 A1 Jul. 16, 2020

Related U.S. Application Data

(63) Continuation of application No. PCT/CN2019/078960, filed on Mar. 21, 2019.

(51) Int. Cl.
*G02B 9/60* (2006.01)
*G02B 13/02* (2006.01)
(Continued)

(52) U.S. Cl.
CPC ........... *G02B 9/60* (2013.01); *G02B 13/0045* (2013.01); *G02B 13/02* (2013.01); *G02B 27/0025* (2013.01); *H04N 5/2254* (2013.01)

(58) Field of Classification Search
None
See application file for complete search history.

(56) References Cited

U.S. PATENT DOCUMENTS 7,864,454 B1* 1/2011 Tang .................. G02B 13/0045
359/764
8,520,124 B2* 8/2013 Ozaki .................... G02B 13/18
348/241

(Continued)

FOREIGN PATENT DOCUMENTS

CN 102369470 A 3/2012
CN 203178557 U 9/2013
(Continued)

OTHER PUBLICATIONS

International Search Report dated May 29, 2019, in connection with Chinese Patent Application No. PCT/CN2019/078960.
(Continued)

*Primary Examiner* — Darryl J Collins
(74) *Attorney, Agent, or Firm* — Norris McLaughlin, P.A.

(57) ABSTRACT

The present disclosure discloses an imaging lens assembly including, sequentially from an object side to an image side along an optical axis, a first lens, a second lens, a third lens, a fourth lens and a fifth lens. Here, the first lens has a positive refractive power, and an object-side surface thereof is a convex surface, and an image-side surface thereof is also a convex surface; the second lens has a negative refractive power; the third lens has a positive refractive power, and an object-side surface thereof is a concave surface; the fourth lens has a positive refractive power; the fifth lens has a negative refractive power and an object-side surface thereof is a concave surface and an image-side surface thereof is a concave surface; and the imaging lens assembly satisfies $3 \leq T34/T23 \leq 7$.

20 Claims, 18 Drawing Sheets

(51) Int. Cl.
*G02B 13/00* (2006.01)
*G02B 27/00* (2006.01)
*H04N 5/225* (2006.01)

(56) References Cited

U.S. PATENT DOCUMENTS

| | | | |
|---|---|---|---|
| 9,766,430 B2 | 9/2017 | Ota et al. | |
| 2011/0249347 A1* | 10/2011 | Kubota | G02B 13/0045 359/764 |
| 2011/0310494 A1 | 12/2011 | Ise et al. | |
| 2012/0127359 A1* | 5/2012 | Chen | G02B 13/18 348/340 |
| 2012/0300316 A1* | 11/2012 | Tsai | G02B 13/0045 359/714 |
| 2013/0279020 A1 | 10/2013 | Noda | |
| 2015/0062726 A1* | 3/2015 | Nishihata | G02B 13/0045 359/740 |

FOREIGN PATENT DOCUMENTS

| | | |
|---|---|---|
| CN | 104238090 U | 12/2014 |
| CN | 204422851 U | 6/2015 |
| CN | 106896481 A | 6/2017 |
| CN | 106990508 A | 7/2017 |
| CN | 108398770 A | 8/2018 |
| JP | 2013/182090 A | 9/2013 |

OTHER PUBLICATIONS

English Translation of International Search Report dated May 29, 2019, in connection with Chinese Patent Application No. PCT/CN2019/078960.

Written Opinion dated Jun. 19, 2019, in connection with Chinese Patent Application No. PCT/CN2019/078960.

\* cited by examiner

OPTICAL IMAGING LENS SET

CROSS-REFERENCE TO RELATED APPLICATIONS

The present patent application is a continuation of International Application No. PCT/CN2019/078960, filed on Mar. 21, 2019, which claims the priority from Chinese Patent Application No. 201810570274.2, filed with the China National Intellectual Property Administration (CNIPA) on Jun. 5, 2018. Both of the aforementioned patent applications are hereby incorporated by reference in their entireties.

TECHNICAL FIELD

The present disclosure relates to an optical imaging lens assembly, more specifically, to an optical imaging lens assembly including five lenses.

BACKGROUND

In recent years, with the rapid replacement of portable electronic products such as smart phones, portable computers, and tablet devices, consumers have higher requirements for the quality of optical imaging lens assemblies used in electronic products.

In the currently popular dual-camera technology, a combination of a long-focus lens assembly and a wide-angle lens assembly is usually used to achieve auto-zoom, and thereby meeting the market demand for high imaging performance. In order to ensure the good imaging effect of the dual-camera lens assembly, requirements are put forward for the long-focus lens assembly therein correspondingly. The long-focus lens assembly is not only required to have a long focal length, but also required to have excellent imaging quality and low sensitivity.

SUMMARY

The present disclosure provides an optical imaging lens assembly such as a long-focus lens assembly that at least or partially addresses at least one of the above disadvantages of the prior art.

According to an aspect of the present disclosure, the present disclosure provides an optical imaging lens assembly, which includes, sequentially from an object side to an image side along an optical axis, a first lens, a second lens, a third lens, a fourth lens and a fifth lens. The first lens may have a positive refractive power, an object-side surface thereof may be a convex surface and an image-side surface thereof may be a convex surface; the second lens may have a negative refractive power; the third lens has a positive refractive power or a negative refractive power, and an object-side surface thereof may be a concave surface; the fourth lens may have a positive refractive power; and the fifth lens may have a negative refractive power, an object-side surface thereof may be a concave and an image-side surface thereof may be a concave surface.

In one implementation, a spaced distance T34 on the optical axis between the third lens and the fourth lens and a spaced distance T23 on the optical axis between the second lens and the third lens may satisfy $3 \leq T34/T23 \leq 7$.

In one implementation, half of a maximal field-of-view HFOV of the optical imaging lens assembly may satisfy HFOV<30°.

In one implementation, an effective focal length f2 of the second lens and a radius of curvature R4 of an image-side surface of the second lens may satisfy $-2.5 < f2/R4 < -1.4$.

In one implementation, a radius of curvature R2 of the image-side surface of the first lens and a radius of curvature R1 of the object-side surface of the first lens may satisfy $1 < (R2-R1)/(R2+R1) < 2$.

In one implementation, an effective focal length f1 of the first lens and a center thickness CT1 on the optical axis of the first lens may satisfy $2 < f1/CT1 < 3$.

In one implementation, a radius of curvature R5 of the object-side surface of the third lens and a radius of curvature R8 of an image-side surface of the fourth lens may satisfy $|(R5-R8)/(R5+R8)| < 0.8$.

In one implementation, a total effective focal length f of the optical imaging lens assembly and a combined focal length f123 of the first lens, second lens and third lens may satisfy $0.5 < f/f123 < 1.5$.

In one implementation, an effective focal length f4 of the fourth lens and an effective focal length f5 of the fifth lens may satisfy $-2 < f4/f5 < -1$.

In one implementation, a radius of curvature R9 of the object-side surface of the fifth lens and a radius of curvature R10 of the image-side surface of the fifth lens R10 may satisfy $|(R9+R10)/(R9-R10)| \leq 1$.

In one implementation, a total effective focal length f of the optical imaging lens assembly and a combined focal length f45 of the fourth lens and the fifth lens may satisfy $-1 < f/f45 < 0$.

In one implementation, a center thickness CT5 on the optical axis of the fifth lens and a center thickness CT4 on the optical axis of the fourth lens may satisfy $0.4 < CT5/CT4 < 1.4$.

In one implementation, a distance TTL on the optical axis from the object-side surface of the first lens to an imaging plane of the optical imaging lens assembly and a total effective focal length f of the optical imaging lens assembly may satisfy $TTL/f \leq 0.95$.

The present disclosure employs five lenses, and the optical imaging lens assembly described above has at least one advantageous effect such as long-focus, high imaging quality and low sensitivity and the like by properly assigning the refractive power, the surface shape, the center thickness of each lens, and the spaced distance on the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings.

DETAILED DESCRIPTION OF EMBODIMENTS

Figure 1:
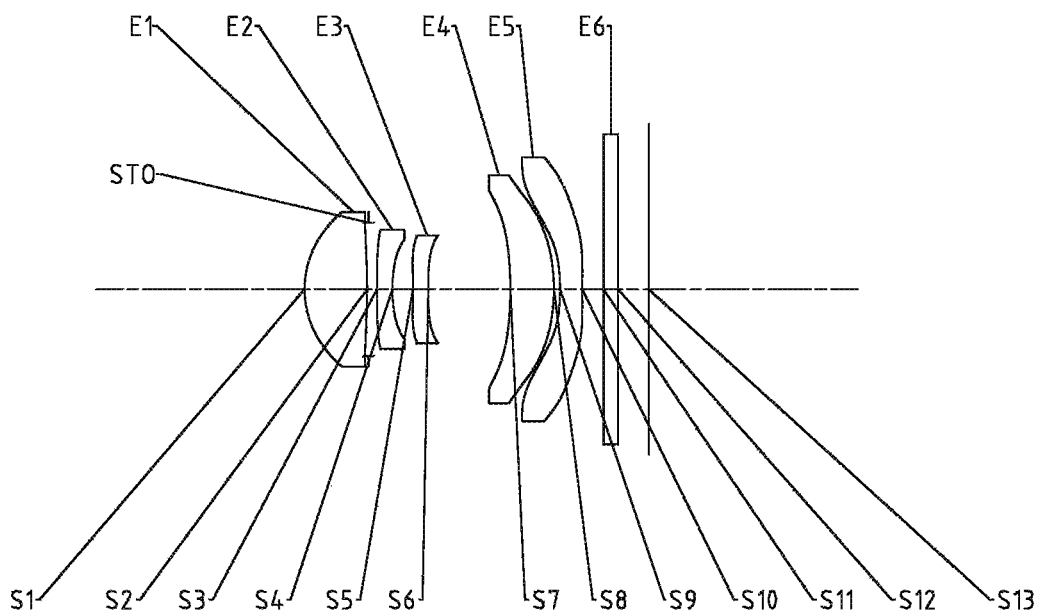
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in anyway for limiting the scope of the present disclosure. Throughout the specification, the same reference numerals designate the same elements. The expression "and/or" includes any and all combinations of one or more of the associated listed items.

It should be noted that, in the present specification, the expressions such as first, second, third and so on are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the convex position is not defined, it indicates that the surface of the lens is convex at least in the paraxial region; if a surface of a lens is a concave surface and the concave position is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments. The features, principles, and other aspects of the present disclosure are described in detail below.

An imaging lens assembly according to exemplary implementations of the present disclosure may include, for example, five lenses having refractive power, i.e., a first lens, a second lens, a third lens, a fourth lens and a fifth lens. These five lenses are sequentially arranged from an object side to an image side along an optical axis, and there may be air intervals between each adjacent lenses.

In an exemplary implementation, the first lens may have a positive refractive power, and an object-side surface thereof may be a convex surface, and an image-side surface thereof may be a convex surface; the second lens may have a negative refractive power; and the third lens has a positive or a negative refractive power, and an object-side thereof may be a concave surface. By properly controlling the refractive powers and surface shapes of the first lens, the second lens and the third lens, the longitudinal aberration of the on-axis field-of-view is advantageously reduced, so as to achieve a good imaging performance on the on-axis area. Meanwhile, by properly controlling the refractive powers and surface shapes of the first lens, the second lens and the third lens, the overall length of the imaging lens assembly is advantageously shortened, which in turn to achieve the characteristics of miniaturization. Further, an image-side surface of the second lens may be a concave surface.

In an exemplary implementation, the fourth lens may have a positive refractive power; and the fifth lens may have a negative refractive power, and an object-side surface thereof may be a concave surface and an image-side surface thereof may be a concave surface. By properly assigning the refractive powers and the surface shapes of the fourth lens and the fifth lens, the incident angle of the main ray of the optical system can be reduced, and the matching with the main ray angle of the chip can be improved. Further, the image-side surface of the fourth lens may be a convex plane.

In an exemplary implementation, the optical imaging lens assembly of the present disclosure may satisfy HFOV<30°, where HFOV is half of a maximal field-of-view of the optical imaging lens assembly. More specifically, HFOV may further satisfy 22°≤HFOV≤25°, for example, 23.0°≤HFOV≤23.6°.

In an exemplary implementation, the optical imaging lens assembly of the present disclosure may satisfy 3≤T34/T23≤7, where T34 is a spaced distance on the optical axis between the third lens and the fourth lens and T23 is a spaced distance on the optical axis between the second lens and the third lens. More specifically, T34 and T23 may further satisfy 3.24≤T34/T23≤37.00.

By controlling the field-of-view of the optical system and the ratio of the air interval between the third and fourth lens to the air interval between the second and third lens, the system may have characteristics of long-focal and easy processing.

In an exemplary implementation, the optical imaging lens assembly of the present disclosure may satisfy −2.5<f2/R4<−1.4, where f2 is an effective focal length of the second lens, and R4 is a radius of curvature of an image-side surface of the second lens. More specifically, f2 and R4 may further satisfy −2.43≤f2/R4≤−1.48. By controlling the ratio of the effective focal length of the second lens to the radius of curvature of the image-side surface of the second lens, the field curvature contribution of the image-side surface of the second lens can be controlled within a suitable range, and thereby compensating the curvature contribution of the rear lenses.

In an exemplary implementation, the optical imaging lens assembly of the present disclosure may satisfy 1<(R2−R1)/(R2+R1)<2, where R2 is a radius of curvature of the image-side surface of the first lens, and R1 is a radius of curvature of the object-side surface of the first lens. More specifically, R2 and R1 may further satisfy 1.28≤(R2−R1)/(R2+R1)≤1.83. By constraining the ratio of the difference between the radii of curvature of the image-side surface and the object-side surface of the first lens to the sum of the radii of curvature of the image-side surface and the object-side surface of the first lens to be within a certain range, coma of the on-axis and off-axis fields-of-view can be effectively reduced, so that the imaging system has good imaging quality.

In an exemplary implementation, the optical imaging lens assembly of the present disclosure may satisfy 2<f1/CT1<3, where f1 is an effective focal length of the first lens, and CT1 is a center thickness on the optical axis of the first lens. More specifically, f1 and CT1 may further satisfy 2.23≤f1/CT1≤2.77. By controlling the ratio of the effective focal length of the first lens to the center thickness on the optical axis of the first lens, the distortion contribution of each field-of-view of the system can be controlled to be within a suitable range, the aberration of the system can be reduced, thereby improving the imaging quality of system.

In an exemplary implementation, the optical imaging lens assembly of the present disclosure may satisfy −2<f4/f5<−1, wherein f4 is an effective focal length of the fourth lens, and f5 is an effective focal length of the fifth lens. More specifically, f4 and f5 may further satisfy −1.65≤f4/f5≤−1.13. By properly assigning the refractive power of the fourth lens and the refractive power of the fifth lens, and constraining the ratio thereof to be within a certain range, the off-axis aberration of the optical system can be advantageously compensated.

In an exemplary implementation, the optical imaging lens assembly of the present disclosure may satisfy |(R9+R10)/(R9−R10)|≤1, where R9 is a radius of curvature of the object-side surface of the fifth lens, and R10 is a radius of curvature of the image-side surface of the fifth lens. More specifically, R9 and R10 may further satisfy 0≤|(R9+R10)/(R9−R10)|1, for example, 0.25≤|(R9+R10)/(R9−R10)|≤1. By constraining the ratio of the sum of the radii of curvature of the object-side surface and the image-side surface of the fifth lens to the difference between the radii of curvature of the object-side surface and the image-side surface of the fifth lens to be within a certain range, the field curvature of each field-of-view can be effectively compensated to be within a suitable range, so that the imaging system may have a good imaging quality.

In an exemplary implementation, the optical imaging lens assembly of the present disclosure may satisfy |(R5−R8)/(R5+R8)|<0.8, where R5 is a radius of curvature of the object-side surface of the third lens, and R8 is a radius of curvature of an image-side surface of the fourth lens. More specifically, R5 and R8 may further satisfy 0<|(R5−R8)/(R5+R8)|<0.8, for example, 0.26≤(R5−R8)/(R5+R8)|≤0.74. By constraining the ratio of the difference between the radii of curvature of the object-side surface of the third lens and the image-side surface of the fourth lens to the sum of the radii of curvature of the object-side surface of the third lens and the image-side surface of the fourth lens to be within a certain range, deflection angle of the incident ray of the system from the third lens to the fourth lens can be effectively reduced, and the distribution of the light beam on the curved surface can be properly adjusted, thereby reducing the sensitivity of the system.

In an exemplary implementation, the optical imaging lens assembly of the present disclosure may satisfy 0.5<f/f123<1.5, where f is a total effective focal length of the optical imaging lens assembly, and f123 is a combined focal length of the first lens, second lens and third lens. More specifically, f and f123 may further satisfy 0.90<f/f123<1.30, for example, 0.99≤f/f123≤1.25. By constraining the ratio of f to f123 to be within a certain range, the refractive power of the system can be properly assigned, so that the system may have a good imaging quality and the sensitivity of the system is effectively reduced.

In an exemplary implementation, the optical imaging lens assembly of the present disclosure may satisfy −1<f/f45<0, where f is a total effective focal length of the optical imaging lens assembly and f45 is a combined focal length of the fourth lens and the fifth lens. More specifically, f and f45 may further satisfy −0.79≤f/f45≤−0.06. By constricting the ratio of f to f45 to be within a certain range, the angle of main ray incident on the imaging plane of the system can be properly and effectively reduced, and the matching between the lens assembly and the chip can be improved.

In an exemplary implementation, the optical imaging lens assembly of the present disclosure may satisfy TTL/f≤0.95, where TTL is a distance on the optical axis from the object-side surface of the first lens to an imaging plane of the optical imaging lens assembly, and f is a total effective focal length of the optical imaging lens assembly. More specifically, TTL and f may further satisfy 0.8≤TTL/f≤0.95, for example 0.90≤TTL/f≤0.95. By controlling the ratio of the total optical length of the imaging system to the total effective focal length of the system, a long-focal characteristic and an high pixel characteristic of the optical system may be advantageously achieved.

In an exemplary implementation, the optical imaging lens assembly of the present disclosure may satisfy 0.4<CT5/CT4<1.4, where CT5 is a center thickness on the optical axis of the fifth lens, and CT4 is a center thickness on the optical axis of the fourth lens. More specifically, CT5 and CT4 may further satisfy 0.45≤CT5/CT4≤1.38. By controlling the ratio of the center thickness on the optical axis of the fifth lens to the center thickness on the optical axis of the fourth lens to be within a certain range, the system can be provided with easy processing characteristics.

In an exemplary implementation, the optical imaging lens assembly described above may further include at least one stop to improve the imaging quality of the lens assembly. The stop may be disposed at any position between the object side and image side as needed. For example, the stop may be disposed between the object side and the first lens, between the first lens and the second lens, or between the second lens and the third lens.

Alternatively, the optical imaging lens assembly described above may further include an optical filter for correcting chromatic aberration and/or a protective glass for protecting a photosensitive element on the imaging plane.

The optical imaging lens assembly according to the above implementations of the present disclosure may employ a plurality of lenses, such as five lenses as described above. By properly distributing the refractive power, the surface shape, the center thickness of each lens, and spaced distances on the optical axis between the lenses, the size and the sensitivity of the lens assembly can be effectively reduced, and the processability of the optical imaging lens assembly can be improved, such that the optical imaging lens assembly is more advantageous for production processing and can be applied to portable electronic products such as smart phones. At the same time, the optical imaging lens assembly configured as described above may also have advantageous effects such as long-focus, high imaging quality, low sensitivity and the like. The optical imaging lens assembly described above can be used as a long-focus lens assembly and can be used with other well-known wide-angle lens assemblies.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and astigmatic aberration. By using an aspheric lens, the aberrations that occur during imaging can be eliminated as much as possible, and thus improving imaging quality.

However, the one skilled in the art will understand that the numbers of lenses constituting the optical imaging lens assembly can be changed to obtain the various results and advantages described in the present disclosure without departing from the technical solutions to be protected herein. For example, although five lenses have been described as an example in the implementations, the optical imaging lens assembly is not limited to including five lenses. The optical imaging lens assembly may also include other numbers of lenses if desired. Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an example implementation of the present disclosure includes, sequentially from an object side to an image side along an optical axis: a first lens E1, a stop STO, a second lens E2, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a negative refractive power, and an object-side surface S5 thereof is a concave surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 1 shows the surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.3704 | 0.9006 | 1.55 | 56.1 | 0.0000 |
| S2 | aspheric | −7.3633 | 0.0190 | | | 0.0000 |
| STO | spherical | infinite | 0.1225 | | | 0.0000 |
| S3 | aspheric | 14.7518 | 0.2200 | 1.67 | 20.4 | 0.0000 |
| S4 | aspheric | 1.9484 | 0.2977 | | | 0.0000 |
| S5 | aspheric | −6.8375 | 0.2200 | 1.55 | 56.1 | 0.0000 |
| S6 | aspheric | 15.1936 | 1.1807 | | | 0.0000 |
| S7 | aspheric | −4.6989 | 0.6255 | 1.67 | 20.4 | 0.0000 |
| S8 | aspheric | −2.6707 | 0.0886 | | | 0.0000 |

TABLE 1-continued

| Surface number | Surface type | Radius of curvature | Thickness | Material Refractive index | Abbe number | Conic coefficient |
|---|---|---|---|---|---|---|
| S9 | aspheric | −3.3295 | 0.3200 | 1.54 | 55.7 | 0.0000 |
| S10 | aspheric | 14.6980 | 0.3057 | | | 0.0000 |
| S11 | spherical | infinite | 0.2100 | 1.52 | 64.2 | |
| S12 | spherical | infinite | 0.4396 | | | |
| S13 | spherical | infinite | | | | |

As can be seen from Table 1, the object-side surface and the image-side surface of any one of the first lens E1 to the fifth lens E5 are aspheric. In this embodiment, the surface shape x of each aspheric lens can be defined by using, but not limited to, the following aspheric formula:

$$x = \frac{ch^2}{1+\sqrt{1-(k+1)c^2h^2}} + \Sigma A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients A4, A6, A8, A10, A12, A14, A16, A18 and A20 applicable to each aspheric surface S1-S10 in embodiment 1.

TABLE 2

| Surface number | A4 | A6 | A8 | A10 | A12 |
|---|---|---|---|---|---|
| S1 | −5.3000E−04 | −2.5860E−02 | 7.9973E−02 | −1.6114E−01 | 1.5209E−01 |
| S2 | 3.3555E−02 | 1.9017E−01 | −1.0657E+00 | 3.3949E+00 | −6.9842E+00 |
| S3 | −1.0594E−01 | 6.8974E−01 | −2.3494E+00 | 7.2008E+00 | −1.6344E+01 |
| S4 | −1.4777E−01 | 1.1003E+00 | −3.9469E+00 | 1.6203E+01 | −4.0525E+01 |
| S5 | 2.3360E−01 | −2.7686E−01 | 5.7202E+00 | −3.7152E+01 | 1.3920E+02 |
| S6 | 3.0050E−01 | 4.9636E−01 | −3.8369E+00 | 2.2640E+01 | −9.0624E+01 |
| S7 | 2.2520E−03 | 5.3990E−02 | −2.3697E−01 | 3.9150E−01 | −4.1028E−01 |
| S8 | −5.6800E−03 | −1.4000E−02 | −5.6210E−02 | 1.3809E−01 | −1.4142E−01 |
| S9 | −1.8327E−01 | −9.0590E−02 | 4.0253E−01 | −3.6767E−01 | 1.6414E−01 |
| S10 | −2.1777E−01 | 5.2162E−02 | 1.1949E−01 | −1.3662E−01 | 7.1713E−02 |

| Surface number | A14 | A16 | A18 | A20 |
|---|---|---|---|---|
| S1 | −2.9980E−02 | −7.4480E−02 | 6.4394E−02 | −1.6980E−02 |
| S2 | 9.2096E+00 | −7.5102E+00 | 3.4450E+00 | −6.7984E−01 |
| S3 | 2.4870E+01 | −2.3851E+01 | 1.3039E+01 | −3.0975E+00 |
| S4 | 5.0603E+01 | −1.7194E+00 | −6.4337E+01 | 4.9942E+01 |
| S5 | −3.2200E+02 | 4.5205E+02 | −3.5312E+02 | 1.1817E+02 |
| S6 | 2.2706E+02 | −3.4322E+02 | 2.8563E+02 | −1.0011E+02 |
| S7 | 2.8488E−01 | −1.2734E−01 | 3.3435E−02 | −3.8900E−03 |
| S8 | 8.1588E−02 | −2.8260E−02 | 5.6420E−03 | −5.0000E−04 |
| S9 | −3.6360E−02 | 2.4210E−03 | 4.3300E−04 | −6.4000E−05 |
| S10 | −2.2280E−02 | 4.1940E−03 | −4.4000E−04 | 2.0100E−05 |

Table 3 shows effective focal lengths f1 to f5 of respective lens, a total effective focal length f of the optical imaging lens assembly, a total track length TTL (i.e., a distance on the optical axis from the object-side surface S1 of the first lens E1 to the imaging plane S13), and half of the diagonal length ImgH of an effective pixel area on the imaging plane S13 and half of a maximal field-of-view HFOV in embodiment 1.

TABLE 3

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.20 | −3.40 | −8.61 | 8.27 | −5.03 | 5.51 | 4.95 | 2.37 | 23.3 |

Figure 2A:
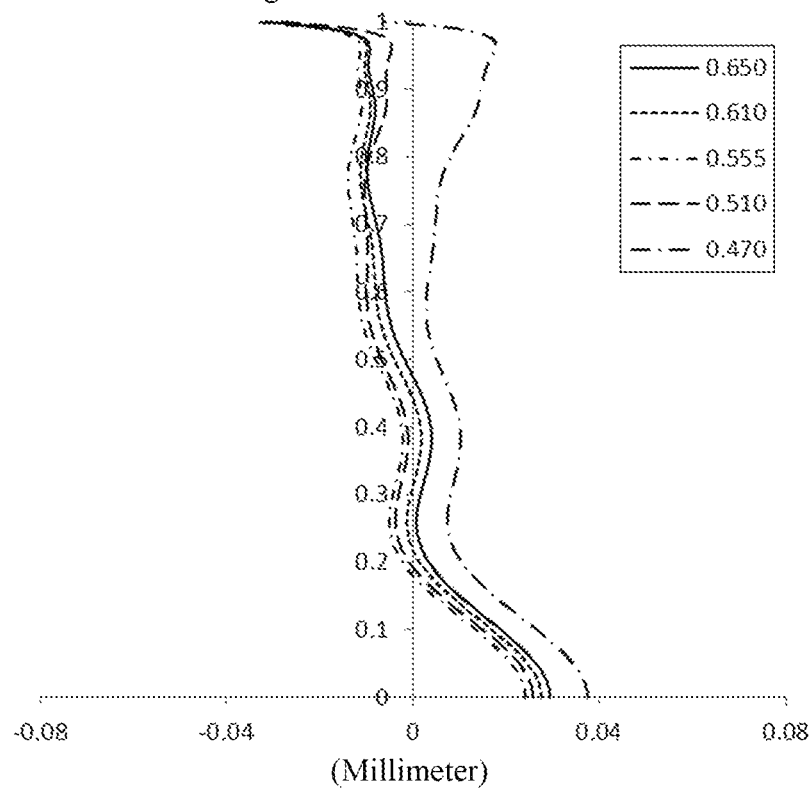
FIG. 2A-2D illustrates a longitudinal aberration curve, an astigmatism curve, a distortion curve and a lateral color curve of the optical imaging lens assembly according to embodiment 1, respectively.
Figure 2B:
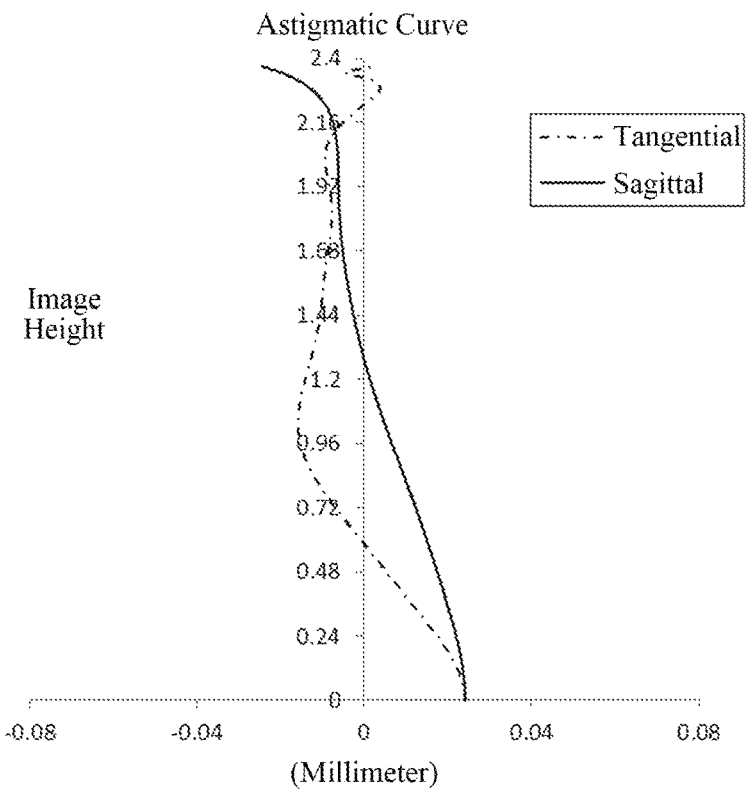
Figure 2C:
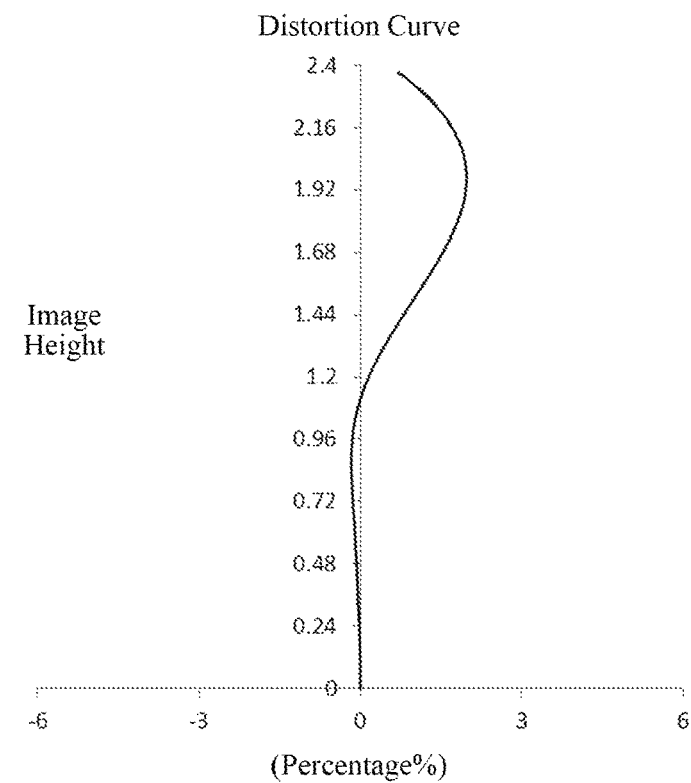
Figure 2D:
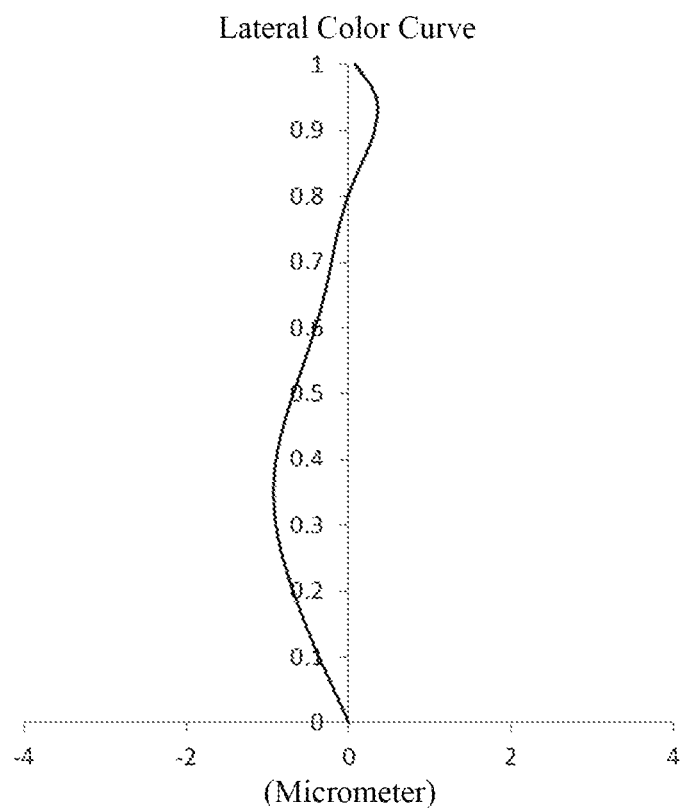

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatism curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different image heights. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve a good imaging quality.

Embodiment 2

Figure 3:
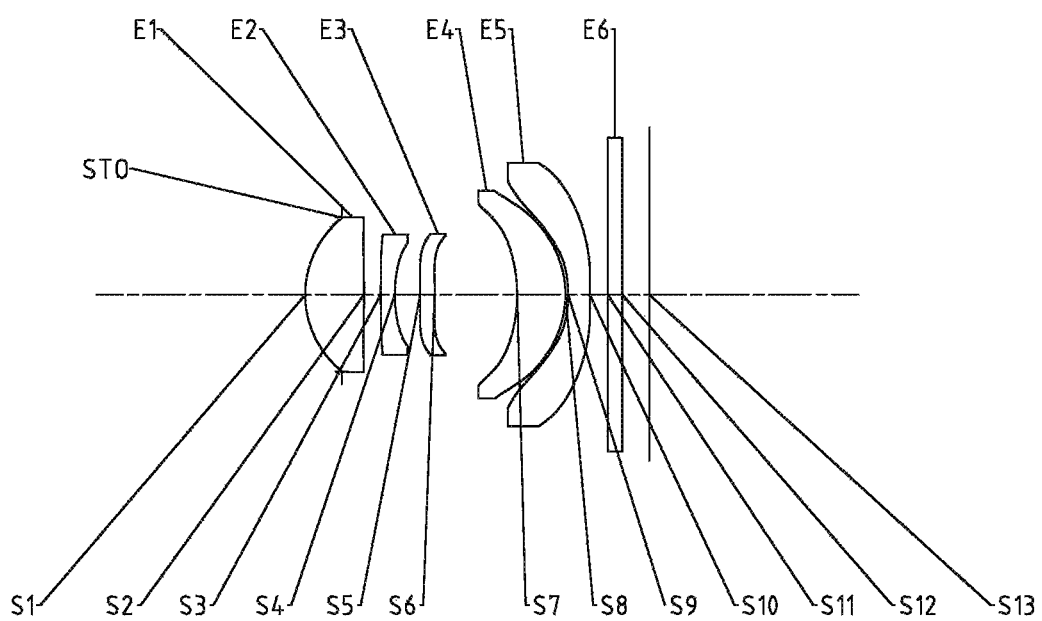
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an example implementation of the present disclosure includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 4 shows the surface type, radius of curvature, thickness, material and conic coefficient of each lens of the optical imaging lens assembly in embodiment 2, wherein the units for the radius of curvature and the thickness are millimeter (mm). Table 5 shows high-order coefficients applicable to each aspheric surface in embodiment 2, wherein the surface shape of each aspheric surface can be defined by the formula (1) given in the above embodiment 1. Table 6 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 2.

TABLE 4

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.5250 | | | |
| S1 | aspheric | 1.4037 | 0.8465 | 1.55 | 56.1 | 0.0458 |
| S2 | aspheric | −11.4872 | 0.2394 | | | −12.7583 |
| S3 | aspheric | 79.5062 | 0.2034 | 1.67 | 20.4 | −98.0000 |
| S4 | aspheric | 2.0592 | 0.3648 | | | −0.8504 |
| S5 | aspheric | −9.1626 | 0.2074 | 1.55 | 56.1 | −9.0198 |
| S6 | aspheric | −8.9733 | 1.1864 | | | −23.1311 |
| S7 | aspheric | −2.1762 | 0.6953 | 1.67 | 20.4 | −1.6542 |
| S8 | aspheric | −1.3589 | 0.0384 | | | −0.9673 |
| S9 | aspheric | −1.8064 | 0.3106 | 1.54 | 55.7 | −0.0993 |
| S10 | aspheric | 10.5883 | 0.2566 | | | −97.1008 |
| S11 | spherical | infinite | 0.2100 | 1.52 | 64.2 | |
| S12 | spherical | infinite | 0.3911 | | | |
| S13 | spherical | infinite | | | | |

TABLE 5

| Surface number | A4 | A6 | A8 | A10 | A12 |
|---|---|---|---|---|---|
| S1 | −2.6700E−03 | −2.3860E−02 | 1.1076E−01 | −3.4819E−01 | 6.6215E−01 |
| S2 | 6.3229E−02 | −4.4990E−02 | −4.9970E−02 | 3.6829E−01 | −8.9131E−01 |
| S3 | 6.4997E−02 | −1.4071E−01 | 4.2873E−01 | −7.4664E−01 | 7.5720E−01 |
| S4 | 5.4345E−02 | 2.6876E−01 | −2.4274E+00 | 1.8880E+01 | −7.8736E+01 |
| S5 | 2.1866E−01 | −1.4396E−01 | 3.1646E+00 | −1.5231E+01 | 4.4240E+01 |
| S6 | 2.5732E−01 | 1.0961E−01 | 3.8398E−01 | 1.1530E−01 | −6.4076E+00 |
| S7 | −2.3400E−03 | 5.1551E−02 | −4.0841E−01 | 8.0696E−01 | −8.8734E−01 |

TABLE 5-continued

| | | | | | |
|---|---|---|---|---|---|
| S8 | 2.3154E−01 | −8.6167E−01 | 1.3909E+00 | −1.2196E+00 | 5.3627E−01 |
| S9 | 5.0210E−02 | −1.2227E+00 | 2.9297E+00 | −3.3889E+00 | 2.2841E+00 |
| S10 | −3.4612E−01 | 2.1533E−01 | 9.2393E−02 | −2.4238E−01 | 1.7953E−01 |

| Surface number | A14 | A16 | A18 | A20 |
|---|---|---|---|---|
| S1 | −7.8704E−01 | 5.6721E−01 | −2.2710E−01 | 3.8721E−02 |
| S2 | 1.2278E+00 | −9.9995E−01 | 4.4817E−01 | −8.5160E−02 |
| S3 | −3.0827E−01 | −2.6843E−01 | 4.2874E−01 | −1.7461E−01 |
| S4 | 1.9942E+02 | −3.0403E+02 | 2.5646E+02 | −9.1648E+01 |
| S5 | −8.0607E+01 | 8.8736E+01 | −5.3700E+01 | 1.3695E+01 |
| S6 | 2.2432E+01 | −3.7036E+01 | 3.0550E+01 | −1.0066E+01 |
| S7 | 5.7572E−01 | −2.3465E−01 | 6.1232E−02 | −7.8000E−03 |
| S8 | −4.6480E−02 | −6.2640E−02 | 2.6980E−02 | −3.4900E−03 |
| S9 | −9.3846E−01 | 2.3171E−01 | −3.1560E−02 | 1.8180E−03 |
| S10 | −7.2570E−02 | 1.7159E−02 | −2.2400E−03 | 1.2500E−04 |

TABLE 6

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.35 | −3.18 | 573.60 | 4.06 | −2.85 | 5.51 | 4.95 | 2.40 | 23.2 |

Figure 4A:
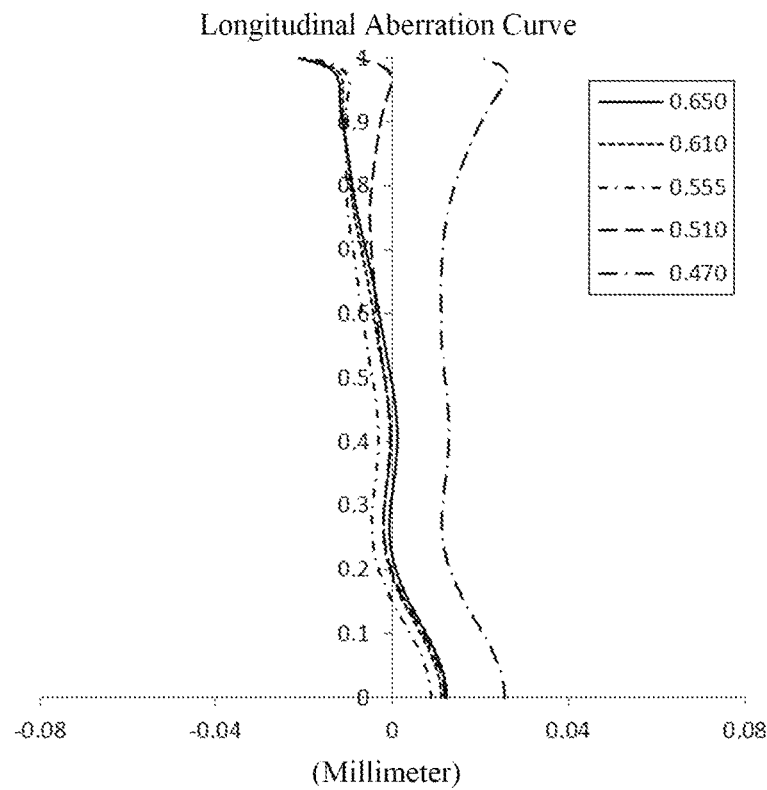
FIG. 4A-4D illustrates a longitudinal aberration curve, an astigmatism curve, a distortion curve and a lateral color curve of the optical imaging lens assembly according to embodiment 2, respectively.
Figure 4B:
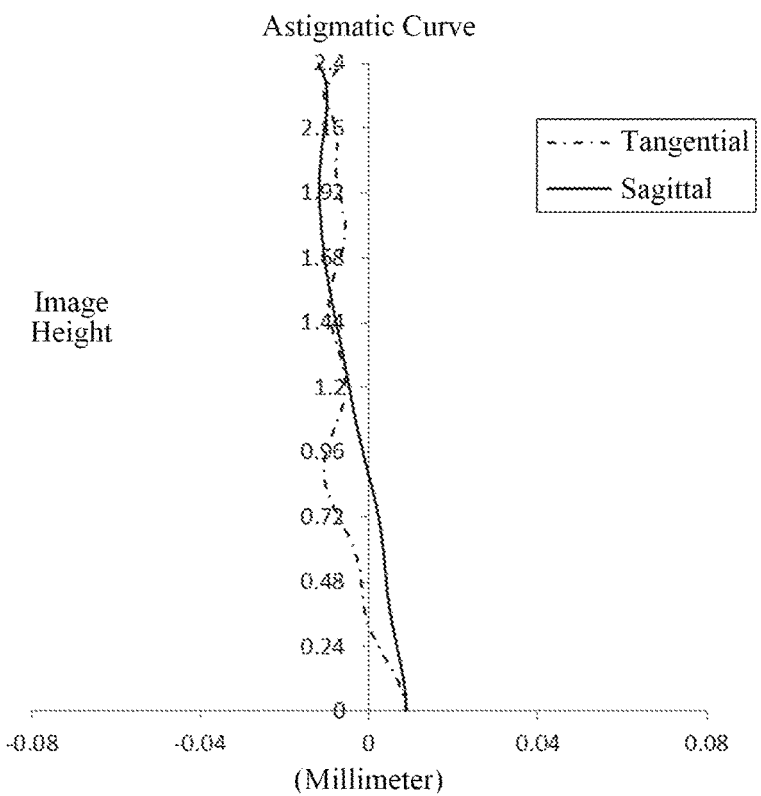
Figure 4C:
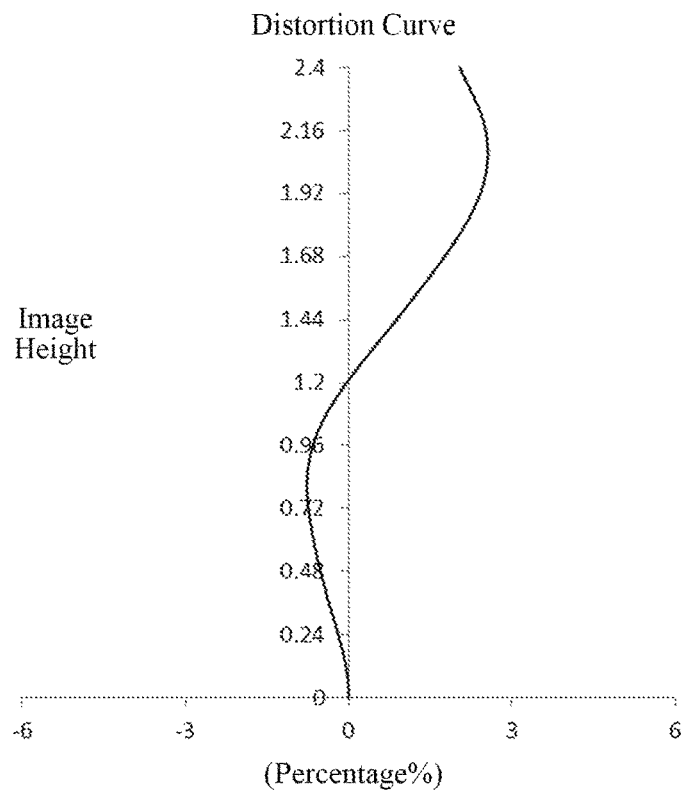
Figure 4D:
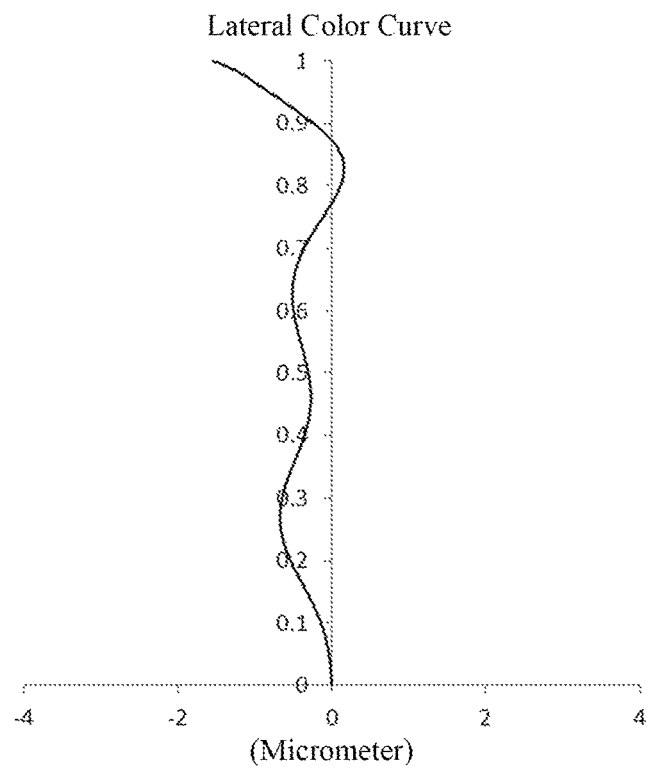

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatism curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different image heights. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve a good imaging quality.

Embodiment 3

Figure 5:
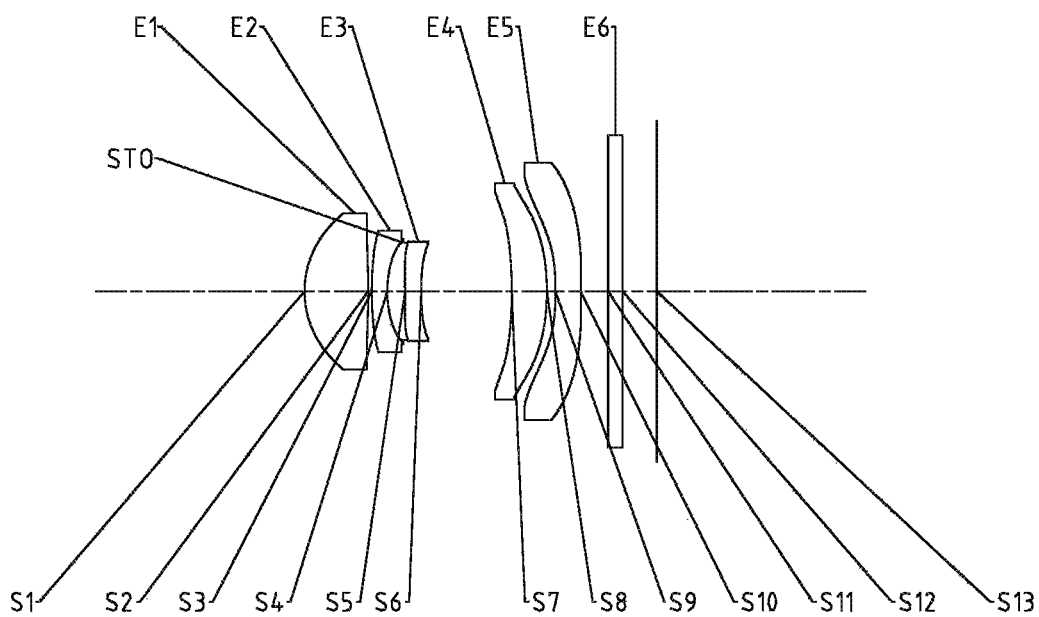
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an example implementation of the present disclosure includes, sequentially from an object side to an image side along an optical axis: a first lens E1, a second lens E2, a stop STO, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a negative refractive power, and an object-side surface S5 thereof is a concave surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 7 shows the surface type, radius of curvature, thickness, material and conic coefficient of each lens of the optical imaging lens assembly in embodiment 3, wherein the units for the radius of curvature and the thickness are millimeter (mm). Table 8 shows high-order coefficients applicable to each aspheric surface in embodiment 3, wherein the surface shape of each aspheric surface can be defined by the formula (1) given in the above embodiment 1. Table 9 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 3.

TABLE 7

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.3702 | 0.9158 | 1.55 | 56.1 | 0.1439 |
| S2 | aspheric | −9.6543 | 0.0506 | | | −26.9541 |

TABLE 7-continued

| Surface number | Surface type | Radius of curvature | Thickness | Material Refractive index | Abbe number | Conic coefficient |
|---|---|---|---|---|---|---|
| S3 | aspheric | 4.4459 | 0.2244 | 1.67 | 20.4 | 16.9138 |
| S4 | aspheric | 1.6113 | 0.2330 | | | 0.4383 |
| STO | spherical | infinite | 0.0220 | | | |
| S5 | aspheric | −11.0477 | 0.2332 | 1.54 | 55.7 | −97.6095 |
| S6 | aspheric | 5.6004 | 1.3010 | | | −14.9841 |
| S7 | aspheric | −6.4032 | 0.5045 | 1.67 | 20.4 | 15.1195 |
| S8 | aspheric | −3.3890 | 0.1233 | | | −22.8425 |
| S9 | aspheric | −5.1754 | 0.3630 | 1.54 | 55.7 | −28.7500 |
| S10 | aspheric | 14.8054 | 0.3943 | | | −72.7573 |
| S11 | spherical | infinite | 0.2100 | 1.52 | 64.2 | |
| S12 | spherical | infinite | 0.4899 | | | |
| S13 | spherical | infinite | | | | |

TABLE 8

| Surface number | A4 | A6 | A8 | A10 | A12 |
|---|---|---|---|---|---|
| S1 | −1.1380E−02 | 1.4485E−02 | −1.2161E−01 | 3.7243E−01 | −7.3217E−01 |
| S2 | −1.3270E−02 | 4.9720E−01 | −2.2414E+00 | 6.2557E+00 | −1.1686E+01 |
| S3 | −1.6649E−01 | 7.8763E−01 | −2.5763E+00 | 5.9171E+00 | −8.6894E+00 |
| S4 | −9.5330E−02 | 4.1834E−01 | 1.6295E+00 | −1.7285E+01 | 8.5823E+01 |
| S5 | 2.4486E−01 | −6.6430E−02 | 2.8801E−01 | 3.3017E−01 | −1.3216E+01 |
| S6 | 3.0565E−01 | 5.6835E−02 | −1.7262E+00 | 1.1751E+01 | −5.2715E+01 |
| S7 | 1.4937E−02 | −6.4350E−02 | 1.1139E−01 | −1.5929E−01 | 1.5761E−01 |
| S8 | −8.0490E−02 | −8.0190E−02 | 2.4175E−01 | −2.9042E−01 | 2.0990E−01 |
| S9 | −1.9372E−01 | −2.3190E−02 | 3.0494E−01 | −3.4775E−01 | 2.0487E−01 |
| S10 | −1.6640E−01 | 1.0477E−01 | −2.3640E−02 | −1.4300E−02 | 1.4284E−02 |

| Surface number | A14 | A16 | A18 | A20 |
|---|---|---|---|---|
| S1 | 8.8232E−01 | −6.4741E−01 | 2.6354E−01 | −4.6430E−02 |
| S2 | 1.4437E+01 | −1.1279E+01 | 5.0401E+00 | −9.8101E−01 |
| S3 | 6.7771E+00 | −8.1485E−01 | −2.4715E+00 | 1.2317E+00 |
| S4 | −2.5032E+02 | 4.4194E+02 | −4.3634E+02 | 1.8905E+02 |
| S5 | 6.7746E+01 | −1.6062E+02 | 1.8895E+02 | −8.7228E+01 |
| S6 | 1.4790E+02 | −2.5009E+02 | 2.3217E+02 | −9.0237E+01 |
| S7 | −1.0539E−01 | 4.5885E−02 | −1.1320E−02 | 1.1760E−03 |
| S8 | −1.0013E−01 | 3.1058E−02 | −5.5200E−03 | 4.1500E−04 |
| S9 | −7.1850E−02 | 1.5185E−02 | −1.8000E−03 | 9.1800E−05 |
| S10 | −5.9300E−03 | 1.4060E−03 | −1.9000E−04 | 1.0800E−05 |

TABLE 9

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.26 | −3.92 | −6.89 | 10.14 | −7.10 | 5.48 | 5.07 | 2.45 | 23.6 |

Figure 6A:
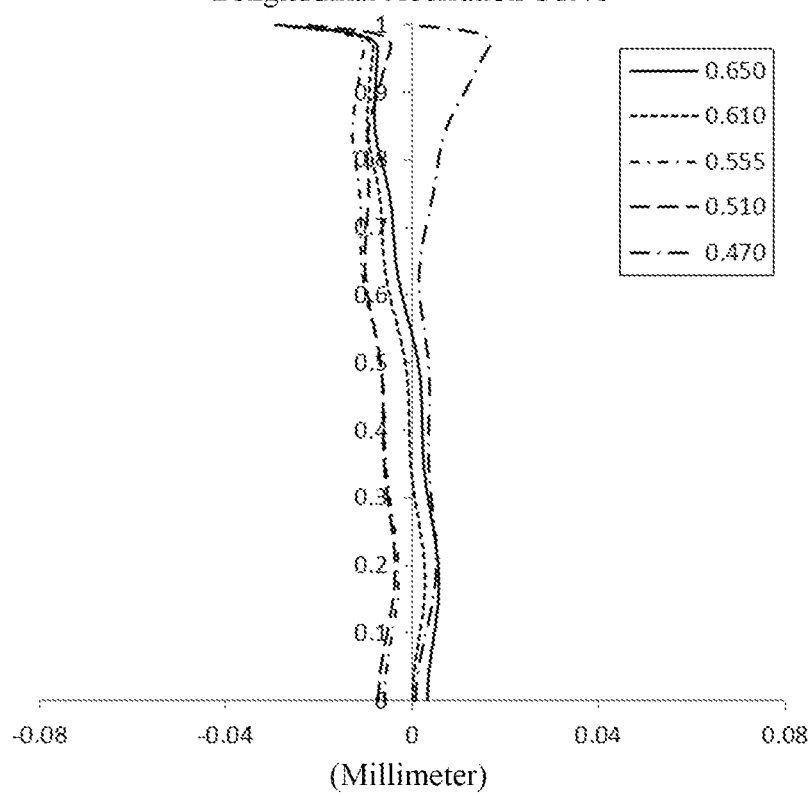
FIG. 6A-6D illustrates a longitudinal aberration curve, an astigmatism curve, a distortion curve and a lateral color curve of the optical imaging lens assembly according to embodiment 3, respectively.
Figure 6B:
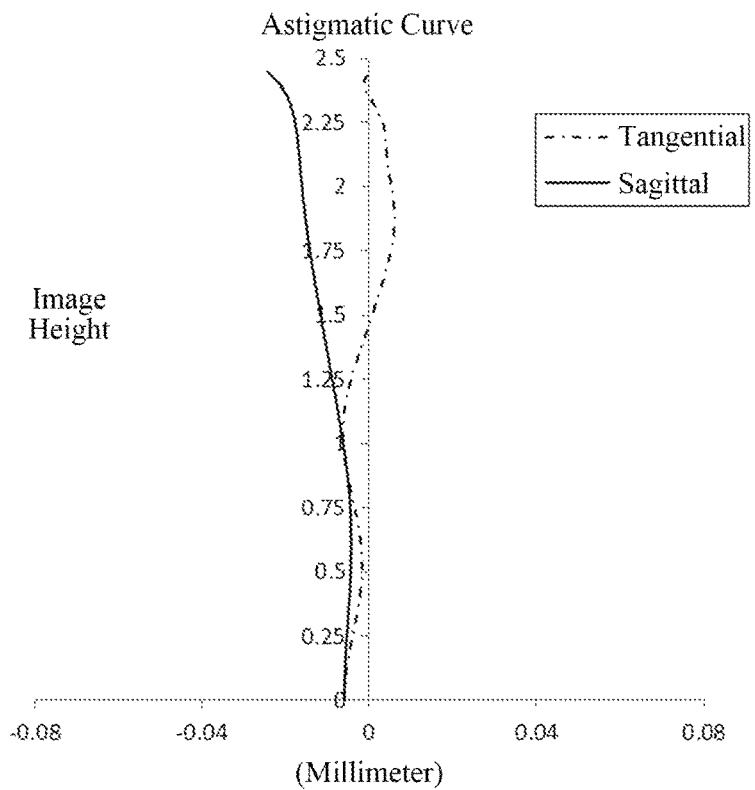
Figure 6C:
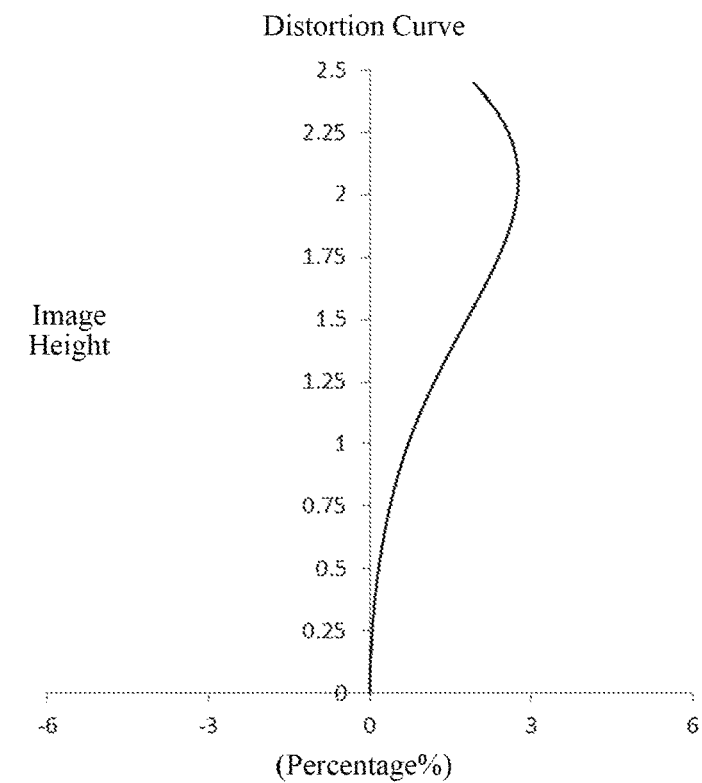
Figure 6D:
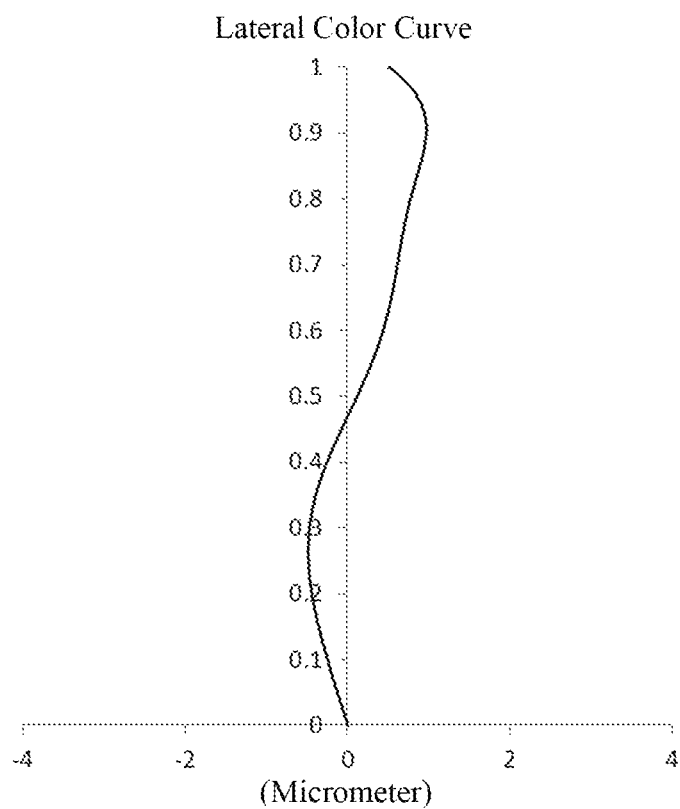

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatism curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different image heights. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve a good imaging quality.

Embodiment 4

Figure 7:
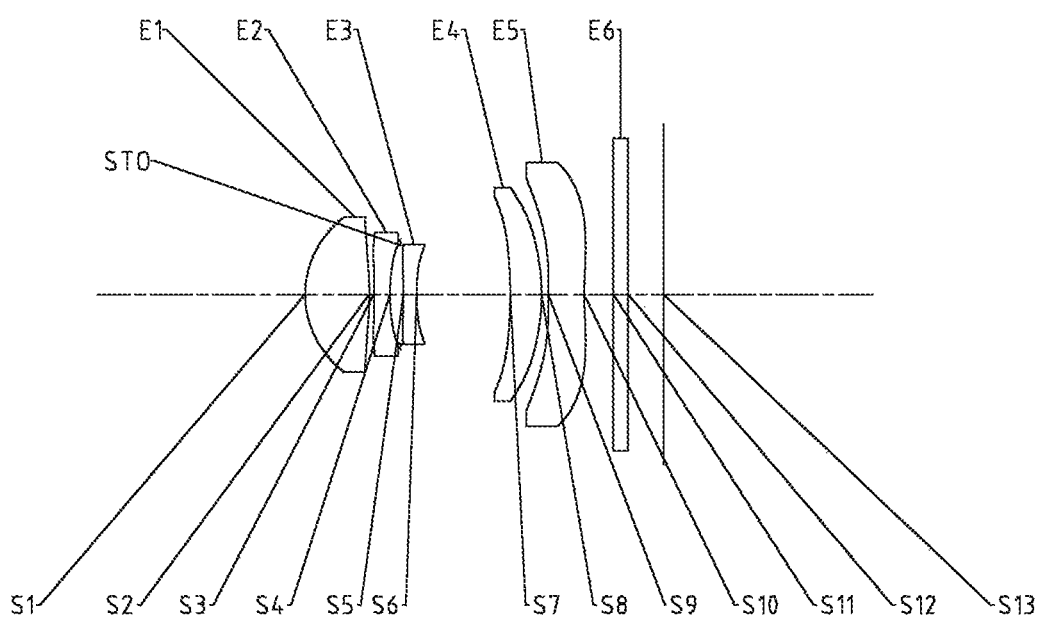
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an example implementation of the present disclosure includes, sequentially from an object side to an image side along an optical axis: a first lens E1, a second lens E2, a stop STO, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a negative refractive power, and an object-side surface S5 thereof is a concave surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 10 shows the surface type, radius of curvature, thickness, material and conic coefficient of each lens of the optical imaging lens assembly in embodiment 4, wherein the units for the radius of curvature and the thickness are millimeter (mm). Table 11 shows high-order coefficients applicable to each aspheric surface in embodiment 4, wherein the surface shape of each aspheric surface can be defined by the formula (1) given in the above embodiment 1. Table 12 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 4.

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.3765 | 0.9217 | 1.55 | 56.1 | 0.1594 |
| S2 | aspheric | −4.6776 | 0.0643 | | | −23.7688 |
| S3 | aspheric | −955.9240 | 0.2332 | 1.67 | 20.4 | −98.0000 |
| S4 | aspheric | 2.5200 | 0.1523 | | | −2.3479 |
| STO | spherical | infinite | 0.0399 | | | |
| S5 | aspheric | −5.8165 | 0.1919 | 1.54 | 55.7 | 29.8626 |
| S6 | aspheric | 4.4132 | 1.3458 | | | −6.0001 |
| S7 | aspheric | −6.3655 | 0.4493 | 1.67 | 20.4 | 14.6562 |
| S8 | aspheric | −3.4406 | 0.0975 | | | −33.2136 |
| S9 | aspheric | −3971.6400 | 0.5146 | 1.54 | 55.7 | −49.0000 |
| S10 | aspheric | 5.0397 | 0.4199 | | | −10.5441 |
| S11 | spherical | infinite | 0.2100 | 1.52 | 64.2 | |
| S12 | spherical | infinite | 0.5156 | | | |
| S13 | spherical | infinite | | | | |

TABLE 11

| Surface number | A4 | A6 | A8 | A10 | A12 |
|---|---|---|---|---|---|
| S1 | −6.8400E−03 | −7.2000E−04 | −5.3000E−03 | −4.7500E−02 | 1.8064E−01 |
| S2 | −2.4340E−02 | 4.6626E−01 | −1.8222E−02 | 4.6623E+00 | −8.1931E+00 |
| S3 | −2.0162E−01 | 1.0392E+00 | −3.4093E+00 | 9.3447E+00 | −1.8753E+01 |
| S4 | −1.8331E−01 | 6.9980E−01 | 1.2025E−01 | −1.0674E+01 | 6.7896E+01 |
| S5 | 3.1616E−01 | −5.2709E−01 | 2.2581E+00 | −1.2190E+01 | 4.7551E+01 |
| S6 | 4.2050E−01 | −3.2594E−01 | −5.9470E−01 | 4.8604E+00 | −1.8723E+01 |
| S7 | −3.9000E−03 | 8.3651E−02 | −2.0848E−01 | 2.2932E−01 | −1.2501E−01 |
| S8 | −1.9076E−01 | 4.1000E−01 | −6.4857E−01 | 6.5111E−01 | −4.1763E−01 |
| S9 | −2.1749E−01 | 3.4191E−01 | −4.8559E−01 | 4.8765E−01 | −3.1533E−01 |
| S10 | −1.1725E−01 | 4.8982E−02 | −1.4660E−02 | −1.1000E−04 | 3.2810E−03 |

| Surface number | A14 | A16 | A18 | A20 |
|---|---|---|---|---|
| S1 | −3.2446E−01 | 3.0489E−01 | −1.4877E−01 | 2.8601E−02 |
| S2 | 9.5959E+00 | −7.1145E+00 | 3.0114E+00 | −5.5272E−01 |
| S3 | 2.5428E+01 | −2.1624E+01 | 1.0319E+01 | −2.0782E+00 |
| S4 | −2.2799E+02 | 4.4275E+02 | −4.6732E+02 | 2.0984E+02 |
| S5 | −1.2302E+02 | 2.0094E+02 | −1.8834E+02 | 7.8702E+01 |
| S6 | 4.4120E+01 | −6.3433E+01 | 5.1228E+01 | −1.7811E+01 |
| S7 | 1.4446E−02 | 1.7976E−02 | −8.2400E−03 | 1.0750E−03 |
| S8 | 1.6914E−01 | −4.2440E−02 | 6.2640E−03 | −4.3000E−04 |
| S9 | 1.2832E−01 | −3.1870E−02 | 4.4290E−03 | −2.6000E−04 |
| S10 | −1.9900E−03 | 5.9500E−04 | −9.3000E−05 | 6.0900E−06 |

TABLE 12

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.06 | −3.78 | −4.65 | 10.60 | −9.38 | 5.42 | 5.16 | 2.45 | 23.4 |

Figure 8A:
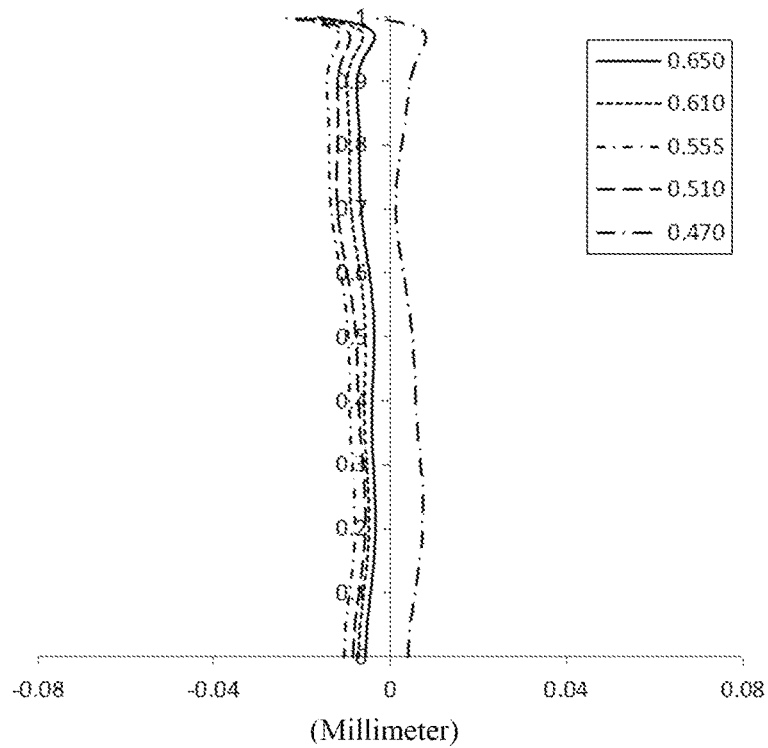
FIG. 8A-8D illustrates a longitudinal aberration curve, an astigmatism curve, a distortion curve and a lateral color curve of the optical imaging lens assembly according to embodiment 4, respectively.
Figure 8B:
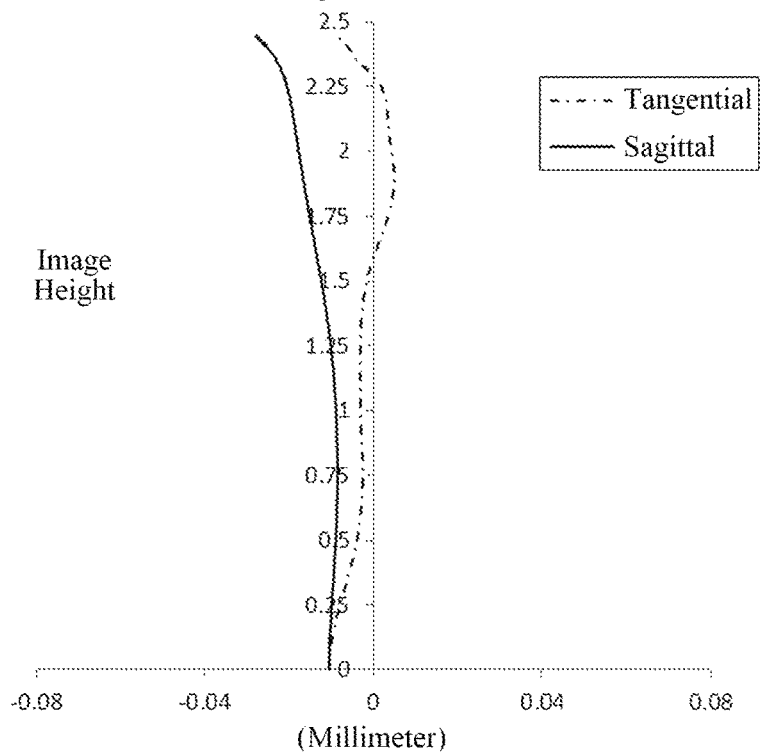
Figure 8C:
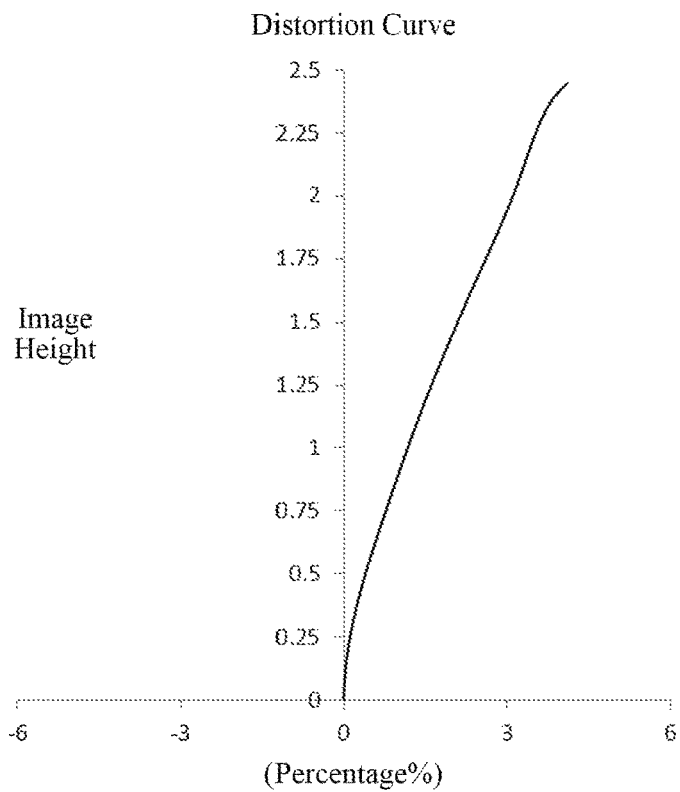
Figure 8D:
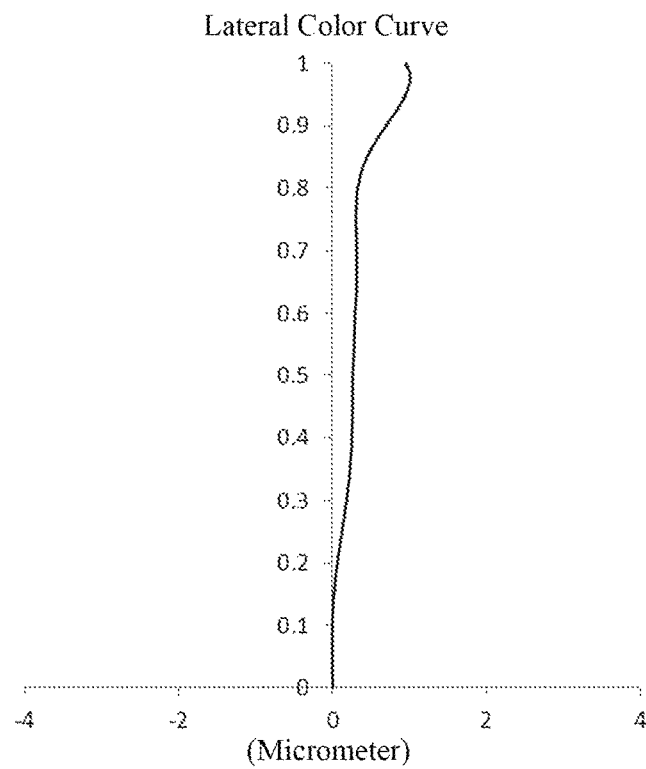

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatism curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different image heights. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve a good imaging quality.

Embodiment 5

Figure 9:
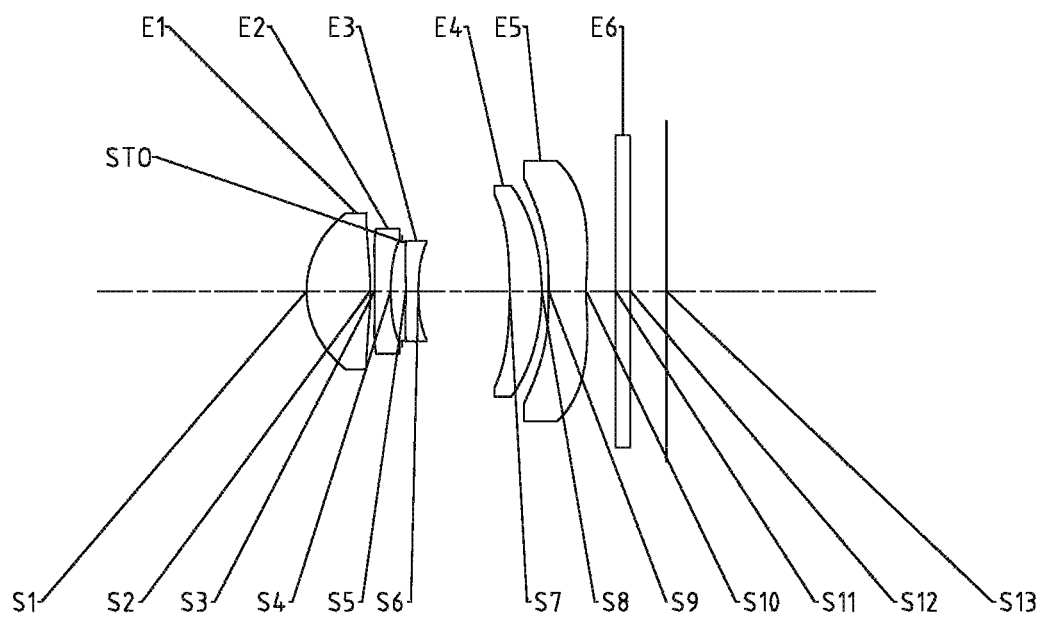
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an example implementation of the present disclosure includes, sequentially from an object side to an image side along an optical axis: a first lens E1, a second lens E2, a stop STO, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a negative refractive power, and an object-side surface S5 thereof is a concave surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 13 shows the surface type, radius of curvature, thickness, material and conic coefficient of each lens of the optical imaging lens assembly in embodiment 5, wherein the units for the radius of curvature and the thickness are millimeter (mm). Table 14 shows high-order coefficients applicable to each aspheric surface in embodiment 5, wherein the surface shape of each aspheric surface can be defined by the formula (1) given in the above embodiment 1. Table 15 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 5.

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.3776 | 0.9160 | 1.55 | 56.1 | 0.1599 |
| S2 | aspheric | −4.7816 | 0.0626 | | | −23.6881 |
| S3 | aspheric | 162.4828 | 0.2307 | 1.67 | 20.4 | −98.0000 |
| S4 | aspheric | 2.4962 | 0.1644 | | | −2.1948 |
| STO | spherical | infinite | 0.0546 | | | |
| S5 | aspheric | −5.8130 | 0.1807 | 1.54 | 55.7 | 29.9979 |
| S6 | aspheric | 4.4172 | 1.3136 | | | −6.2027 |
| S7 | aspheric | −6.3382 | 0.4596 | 1.67 | 20.4 | 14.6707 |
| S8 | aspheric | −3.2737 | 0.0992 | | | −32.2931 |
| S9 | aspheric | −17.5240 | 0.5396 | 1.54 | 55.7 | −73.5000 |
| S10 | aspheric | 6.2326 | 0.4244 | | | −14.4235 |
| S11 | spherical | infinite | 0.2100 | 1.52 | 64.2 | |
| S12 | spherical | infinite | 0.5200 | | | |
| S13 | spherical | infinite | | | | |

TABLE 14

| Surface number | A4 | A6 | A8 | A10 | A12 |
|---|---|---|---|---|---|
| S1 | −6.8300E−03 | −6.4000E−05 | −9.7400E−03 | −2.3070E−02 | 1.0564E−01 |
| S2 | −2.5380E−02 | 4.5696E−01 | −1.6966E+00 | 4.0649E+00 | −6.6319E+00 |

TABLE 14-continued

| | | | | | |
|---|---|---|---|---|---|
| S3 | −2.0145E−01 | 1.0381E+00 | −3.3838E+00 | 9.2065E+00 | −1.8400E+01 |
| S4 | −1.7818E−01 | 6.9978E−01 | −1.9860E−01 | −7.2706E+00 | 4.8140E+01 |
| S5 | 3.2222E−01 | −6.7327E−01 | 3.6256E+00 | −1.9997E+01 | 7.5415E+01 |
| S6 | 4.2513E−01 | −4.8105E−01 | 8.8423E−01 | −3.8671E+00 | 1.5061E+01 |
| S7 | 3.4080E−03 | 5.6054E−02 | −1.4017E−01 | 1.2294E−01 | −2.2190E−02 |
| S8 | −1.8414E−01 | 3.7407E−01 | −5.6272E−01 | 5.3935E−01 | −3.3190E−01 |
| S9 | −2.0376E−01 | 3.0177E−01 | −4.1091E−01 | 4.0390E−01 | −2.5804E−01 |
| S10 | −1.1848E−01 | 5.1200E−02 | −1.9780E−02 | 6.0110E−03 | −1.2100E−03 |

| Surface number | A14 | A16 | A18 | A20 |
|---|---|---|---|---|
| S1 | −1.9652E−01 | 1.8309E−01 | −8.8040E−02 | 1.6229E−02 |
| S2 | 7.1654E+00 | −4.8744E+00 | 1.8846E+00 | −3.1471E−01 |
| S3 | 2.4964E+01 | −2.1377E+01 | 1.0370E+01 | −2.1576E+00 |
| S4 | −1.5989E+02 | 3.0433E+02 | −3.1361E+02 | 1.3756E+02 |
| S5 | −1.8383E+02 | 2.7775E+02 | −2.3648E+02 | 8.7680E+01 |
| S6 | −3.9910E+01 | 6.5480E+01 | −5.9483E+01 | 2.2802E+01 |
| S7 | −4.6810E−02 | 3.9650E−02 | −1.2370E−02 | 1.3990E−03 |
| S8 | 1.2957E−01 | −3.1690E−02 | 4.6840E−03 | −3.4000E−04 |
| S9 | 1.0411E−01 | −2.5680E−02 | 3.5480E−03 | −2.1000E−04 |
| S10 | 1.2800E−05 | 6.9700E−05 | −1.8000E−05 | 1.5800E−06 |

TABLE 15

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.07 | −3.81 | −4.65 | 9.60 | −8.50 | 5.47 | 5.18 | 2.45 | 23.1 |

Figure 10A:
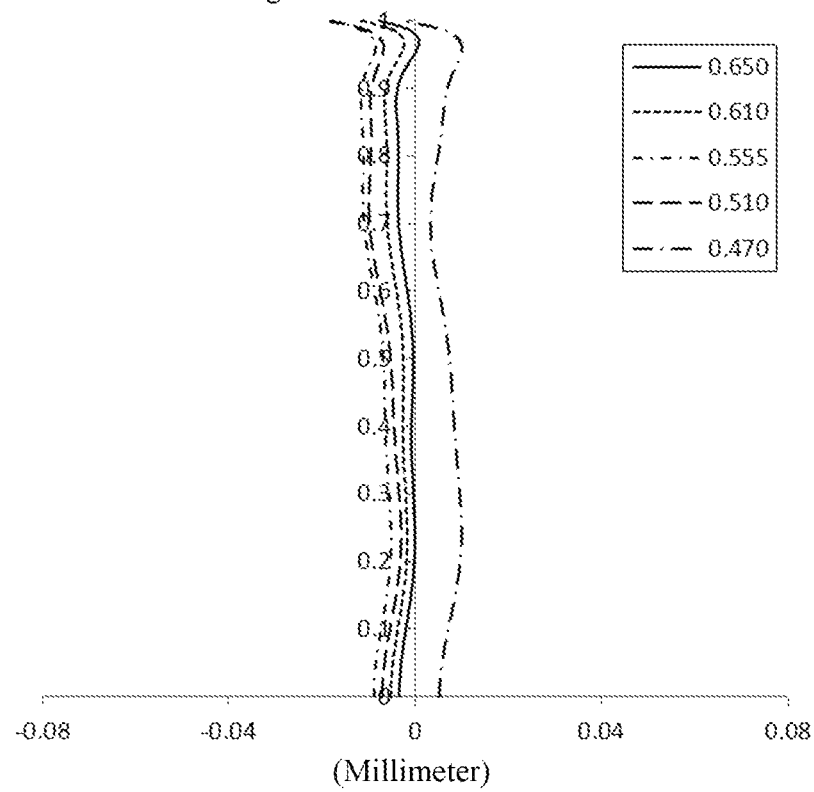
FIG. 10A-10D illustrates a longitudinal aberration curve, an astigmatism curve, a distortion curve and a lateral color curve of the optical imaging lens assembly according to embodiment 5, respectively.
Figure 10B:
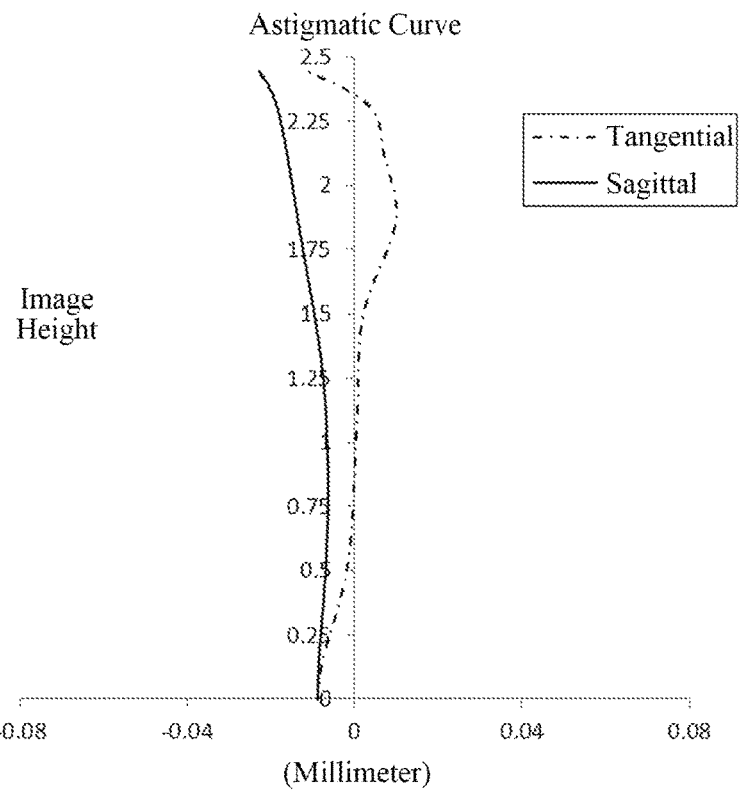
Figure 10C:
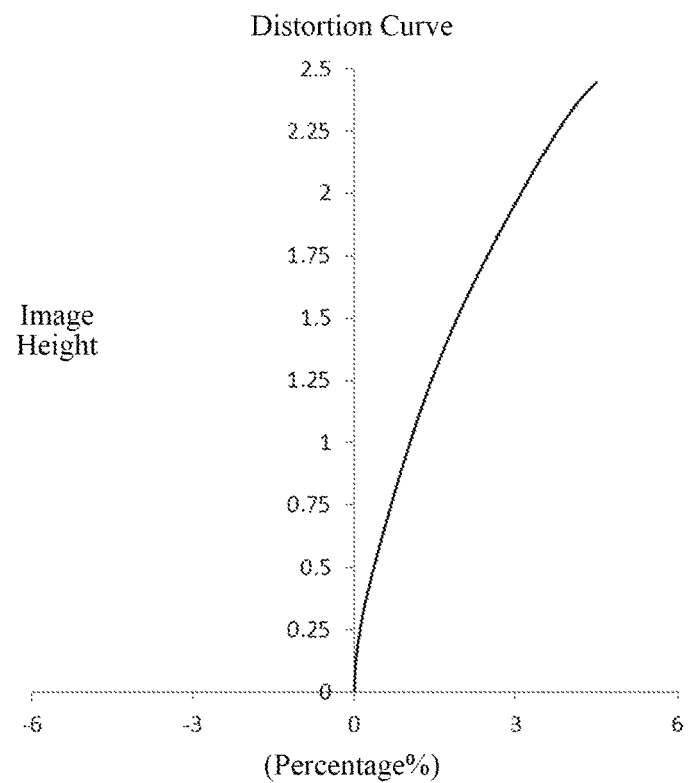
Figure 10D:
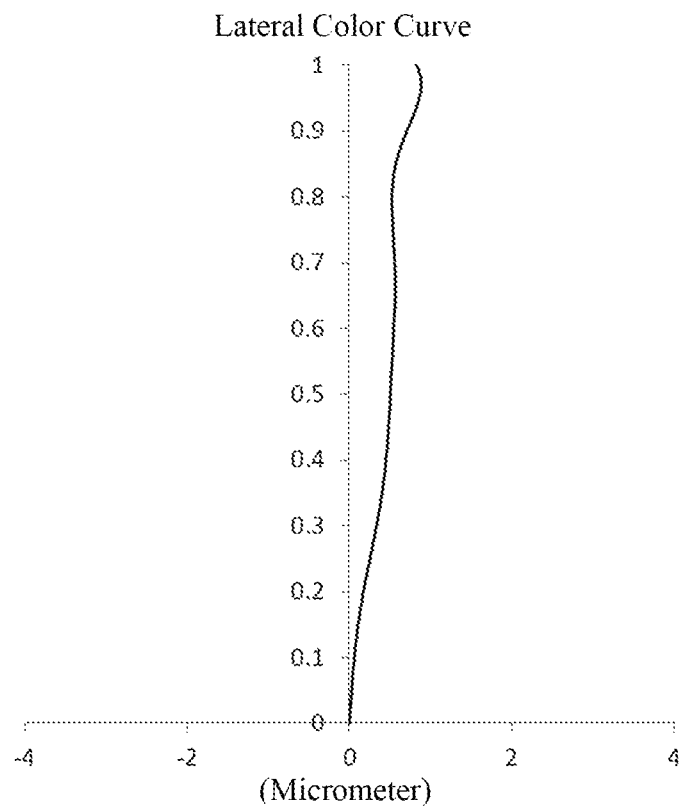

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatism curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different image heights. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve a good imaging quality.

Embodiment 6

Figure 11:
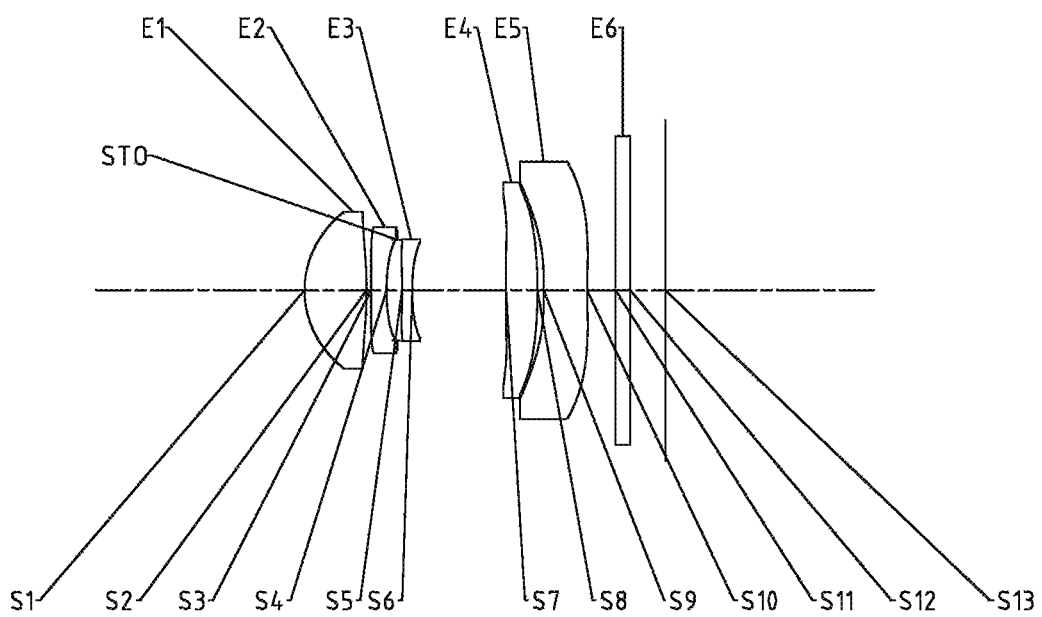
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an example implementation of the present disclosure includes, sequentially from an object side to an image side along an optical axis: a first lens E1, a second lens E2, a stop STO, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a negative refractive power, and an object-side surface S5 thereof is a concave surface, and an image-side surface S6 thereof is a concave surface. The fourth lens E4 has a positive refractive power, and an object-side surface S7 thereof is a convex surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 16 shows the surface type, radius of curvature, thickness, material and conic coefficient of each lens of the optical imaging lens assembly in embodiment 6, wherein the units for the radius of curvature and the thickness are millimeter (mm). Table 17 shows high-order coefficients applicable to each aspheric surface in embodiment 6, wherein the surface shape of each aspheric surface can be defined by the formula (1) given in the above embodiment 1. Table 18 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 6.

TABLE 16

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.3823 | 0.8930 | 1.55 | 56.1 | 0.1586 |
| S2 | aspheric | −5.1163 | 0.0639 | | | −21.9953 |
| S3 | aspheric | 34.1470 | 0.2207 | 1.67 | 20.4 | 88.1637 |
| S4 | aspheric | 2.3801 | 0.1637 | | | −1.6645 |
| STO | spherical | infinite | 0.0611 | | | |
| S5 | aspheric | −6.0447 | 0.1474 | 1.54 | 55.7 | 29.7714 |
| S6 | aspheric | 4.6608 | 1.3469 | | | −8.8572 |
| S7 | aspheric | 34.0102 | 0.4513 | 1.67 | 20.4 | 62.5181 |
| S8 | aspheric | −11.4432 | 0.0918 | | | −98.0000 |
| S9 | aspheric | −14.5186 | 0.6222 | 1.54 | 55.7 | −18.3197 |
| S10 | aspheric | 8.7187 | 0.4106 | | | 6.7812 |
| S11 | spherical | infinite | 0.2100 | 1.52 | 64.2 | |
| S12 | spherical | infinite | 0.5062 | | | |
| S13 | spherical | infinite | | | | |

TABLE 17

| Surface number | A4 | A6 | A8 | A10 | A12 |
|---|---|---|---|---|---|
| S1 | −7.3500E−03 | −6.0000E−05 | −2.3410E−02 | 4.2260E−02 | −4.9420E−02 |
| S2 | −3.3290E−02 | 4.6383E−01 | −1.6408E+00 | 3.7781E+00 | −5.9471E+00 |
| S3 | −1.9819E−01 | 1.0238E+00 | −3.2864E+00 | 8.6933E+00 | −1.6864E+01 |
| S4 | −1.6444E−01 | 7.5524E−01 | −1.3814E+00 | 1.3582E+00 | 9.2421E+00 |
| S5 | 3.2254E−01 | −6.9568E−01 | 3.5175E+00 | −1.8513E+01 | 6.9111E+01 |
| S6 | 4.0565E−01 | −4.0260E−01 | −1.4961E+00 | 3.8478E+00 | −1.6779E+01 |
| S7 | −1.8120E−02 | 5.4918E−02 | −9.6200E−02 | 4.5106E−02 | 3.7519E−02 |
| S8 | −1.4442E−01 | 2.9786E−01 | −3.9946E−01 | 3.2791E−01 | −1.7456E−01 |
| S9 | −2.5193E−01 | 3.6756E−01 | −4.2166E−01 | 3.4823E−01 | −1.9258E−01 |
| S10 | −1.1323E−01 | 6.9482E−02 | −5.6660E−02 | 4.4208E−02 | −2.4990E−02 |

| Surface number | A14 | A16 | A18 | A20 |
|---|---|---|---|---|
| S1 | 1.3531E−02 | 1.7500E−02 | −1.7390E−02 | 3.8210E−03 |
| S2 | 6.2315E+00 | −4.1299E+00 | 1.5613E+00 | −2.5574E−01 |
| S3 | 2.2299E+01 | −1.8688E+01 | 8.8861E+00 | −1.8106E+00 |
| S4 | −4.7936E+01 | 1.0582E+02 | −1.1631E+02 | 5.2771E+01 |
| S5 | −1.6790E+02 | 2.5294E+02 | −2.1461E+02 | 7.8734E+01 |
| S6 | 4.0036E+01 | −5.5648E+01 | 4.2113E+01 | −1.3464E+01 |
| S7 | −6.5080E−02 | 3.8323E−02 | −1.0460E−02 | 1.1030E−03 |
| S8 | 6.1777E−02 | −1.5130E−02 | 2.5860E−03 | −2.3000E−04 |
| S9 | 6.9647E−02 | −1.6100E−02 | 2.2060E−03 | −1.4000E−04 |
| S10 | 9.3040E−03 | −2.1500E−03 | 2.8000E−04 | −1.5000E−05 |

TABLE 18

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.10 | −3.85 | −4.88 | 12.91 | −10.06 | 5.46 | 5.19 | 2.45 | 23.0 |

Figure 12A:
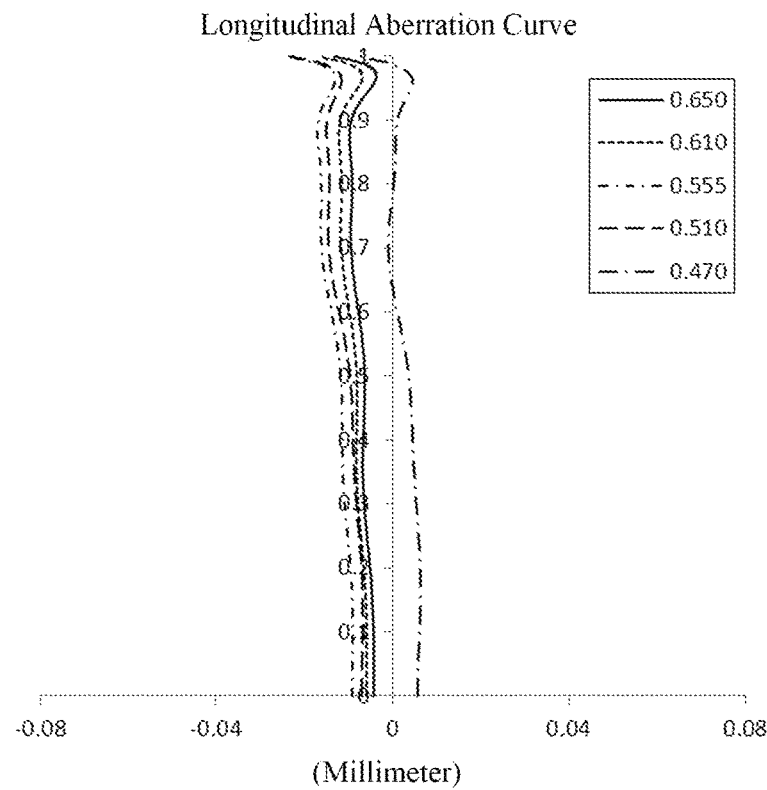
FIG. 12A-12D illustrates a longitudinal aberration curve, an astigmatism curve, a distortion curve and a lateral color curve of the optical imaging lens assembly according to embodiment 6, respectively.
Figure 12B:
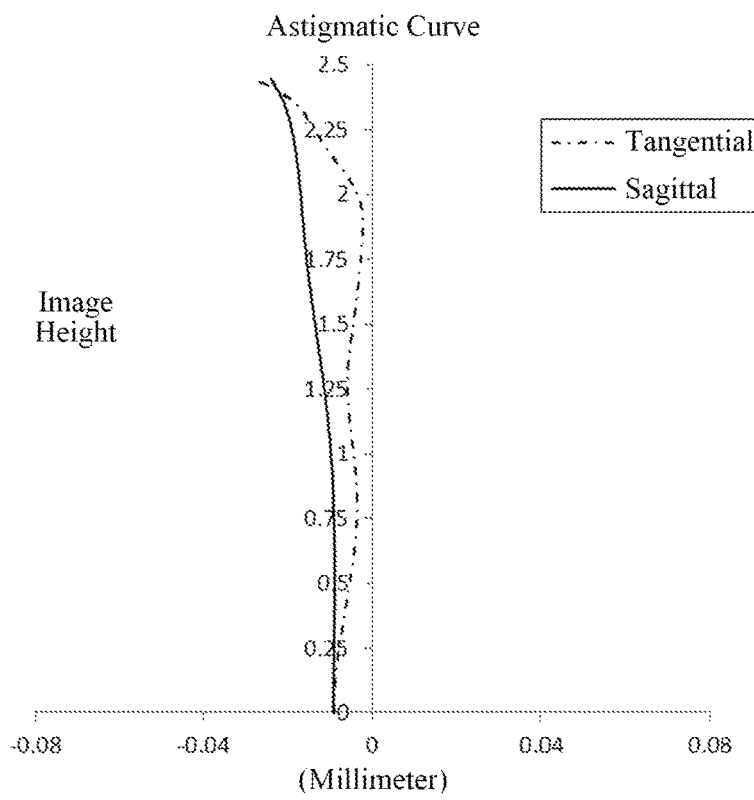
Figure 12C:
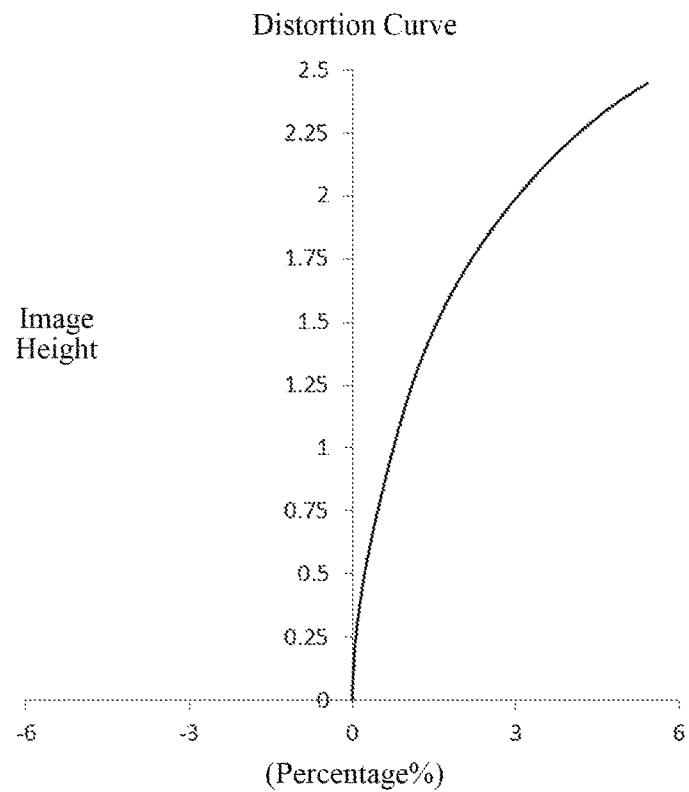
Figure 12D:
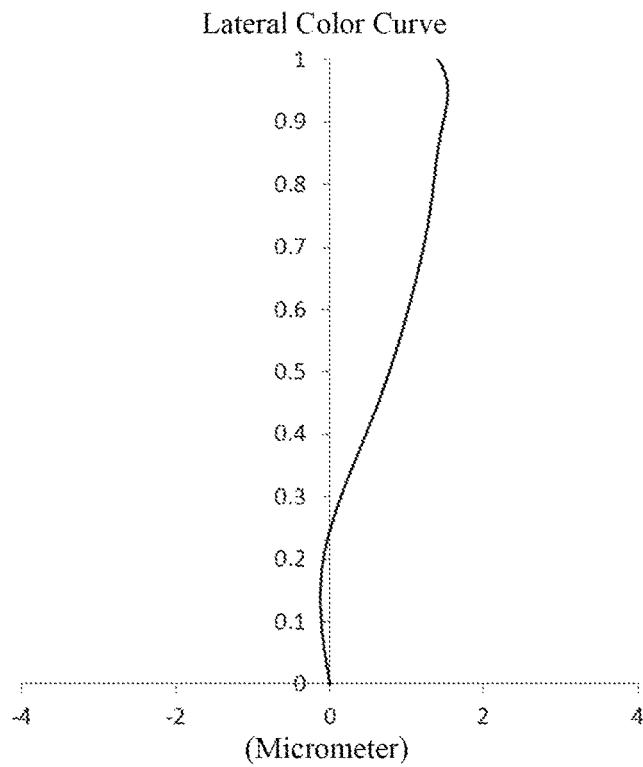

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatism curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different image heights. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve a good imaging quality.

Embodiment 7

Figure 13:
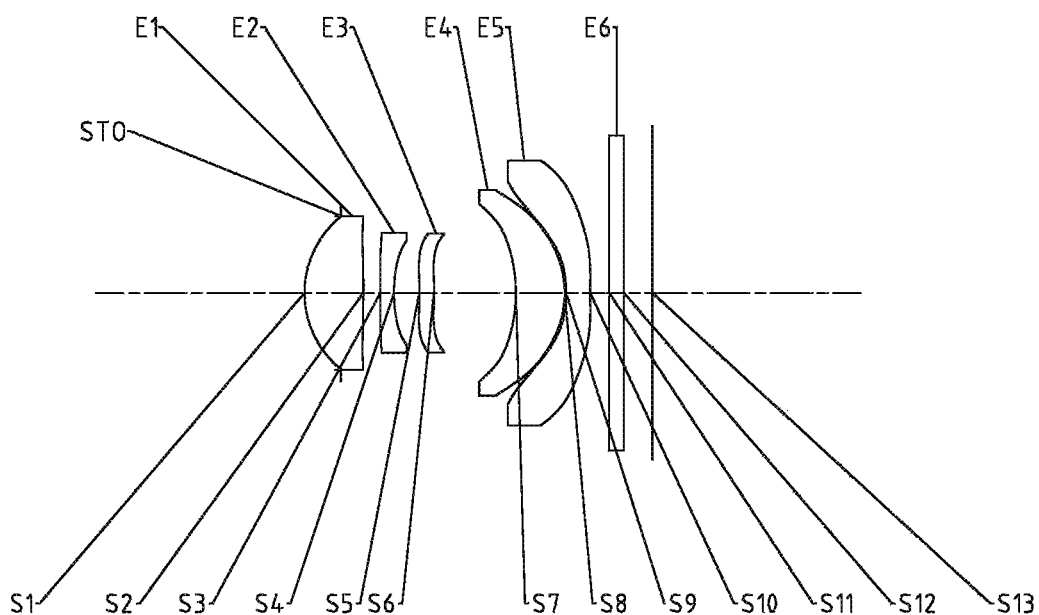
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an example implementation of the present disclosure includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a positive refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 19 shows the surface type, radius of curvature, thickness, material and conic coefficient of each lens of the optical imaging lens assembly in embodiment 7, wherein the units for the radius of curvature and the thickness are millimeter (mm). Table 20 shows high-order coefficients applicable to each aspheric surface in embodiment 7, wherein the surface shape of each aspheric surface can be defined by the formula (1) given in the above embodiment 1. Table 21 shows effective focal lengths f1 to f5 of respective lens, a total effective focal length f of the optical imaging lens assembly, a total track length TTL, and half of the diagonal length ImgH of an effective pixel area on the imaging plane S13 and half of a maximal field-of-view HFOV in embodiment 7.

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5226 | | | |
| S1 | aspheric | 1.4093 | 0.8464 | 1.55 | 56.1 | 0.0490 |
| S2 | aspheric | −10.9257 | 0.2428 | | | −15.5769 |
| S3 | aspheric | −153.7580 | 0.1969 | 1.67 | 20.4 | 98.0000 |
| S4 | aspheric | 2.1481 | 0.3641 | | | −1.0301 |
| S5 | aspheric | −7.5374 | 0.2113 | 1.55 | 56.1 | −11.7363 |
| S6 | aspheric | −7.2238 | 1.1780 | | | −28.4478 |
| S7 | aspheric | −2.1597 | 0.7024 | 1.67 | 20.4 | −1.9575 |
| S8 | aspheric | −1.3515 | 0.0200 | | | −0.9823 |
| S9 | aspheric | −1.8057 | 0.3458 | 1.54 | 55.7 | −0.0968 |
| S10 | aspheric | 15.8867 | 0.2739 | | | −25.0153 |
| S11 | spherical | infinite | 0.2100 | 1.52 | 64.2 | |
| S12 | spherical | infinite | 0.4084 | | | |
| S13 | spherical | infinite | | | | |

TABLE 20

| Surface number | A4 | A6 | A8 | A10 | A12 |
|---|---|---|---|---|---|
| S1 | −4.0300E−03 | −8.7700E−03 | 3.4950E−02 | −1.2228E−01 | 2.4839E−01 |
| S2 | 6.4859E−02 | −6.3820E−02 | 6.4272E−02 | −3.7840E−02 | 1.4940E−03 |
| S3 | 6.3392E−02 | −9.7920E−02 | 5.6345E−02 | 1.1426E+00 | −5.0255E+00 |
| S4 | 5.7019E−02 | 1.3926E−01 | −9.5620E−01 | 8.9733E+00 | −3.7762E+01 |
| S5 | 2.1879E−01 | −1.3698E−01 | 3.1212E+00 | −1.5032E+01 | 4.3667E+01 |
| S6 | 2.6329E−01 | 5.2615E−02 | 7.5797E−01 | −1.2878E+00 | −3.2137E+00 |
| S7 | 1.3580E−03 | 5.3015E−02 | −3.1903E−01 | 4.7559E−01 | −3.5938E−01 |
| S8 | 1.6551E−01 | −7.4614E−01 | 1.4192E+00 | −1.5119E+00 | 9.2505E−01 |
| S9 | −2.5580E−02 | −9.8261E−01 | 2.5761E+00 | −3.0989E+00 | 2.1473E+00 |
| S10 | −2.9967E−01 | 1.7577E−01 | 6.9600E−02 | −1.7437E−01 | 1.2166E−01 |

| Surface number | A14 | A16 | A18 | A20 |
|---|---|---|---|---|
| S1 | −3.1593E−01 | 2.4293E−01 | −1.0371E−01 | 1.8863E−02 |
| S2 | 1.9860E−03 | 2.6097E−02 | −3.1450E−02 | 1.1016E−02 |
| S3 | 1.0691E+01 | −1.3000E+01 | 8.6382E+00 | −2.4337E+00 |
| S4 | 9.4160E+01 | −1.4052E+02 | 1.1572E+02 | −4.0145E+01 |
| S5 | −7.9690E+01 | 8.7915E+01 | −5.3345E+01 | 1.3649E+01 |
| S6 | 1.7986E+01 | −3.3487E+01 | 2.9158E+01 | −9.9137E+00 |
| S7 | 1.3183E−01 | −3.3080E−02 | 1.5090E−02 | −3.7000E−03 |

TABLE 20-continued

| | | | | |
|---|---|---|---|---|
| S8 | −3.0440E−01 | 3.3483E−02 | 7.5730E−03 | −1.8200E−03 |
| S9 | −9.0191E−01 | 2.2678E−01 | −3.1380E−02 | 1.8320E−03 |
| S10 | −4.6270E−02 | 1.0303E−02 | −1.2700E−03 | 6.6900E−05 |

TABLE 21

| f1 (mm) | f2 (mm) | f3 (mm) | f4 (mm) | f5 (mm) | f (mm) | TTL (mm) | ImgH (mm) | HFOV (°) |
|---|---|---|---|---|---|---|---|---|
| 2.34 | −3.18 | 256.87 | 4.03 | −3.00 | 5.49 | 5.00 | 2.40 | 23.1 |

Figure 14A:
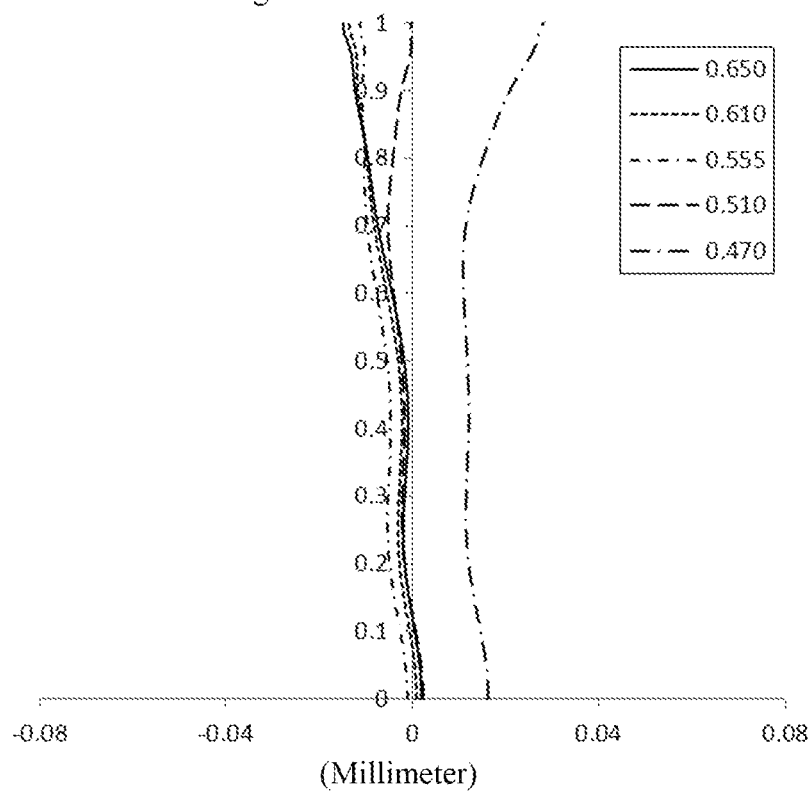
FIG. 14A-14D illustrates a longitudinal aberration curve, an astigmatism curve, a distortion curve and a lateral color curve of the optical imaging lens assembly according to embodiment 7, respectively.
Figure 14B:
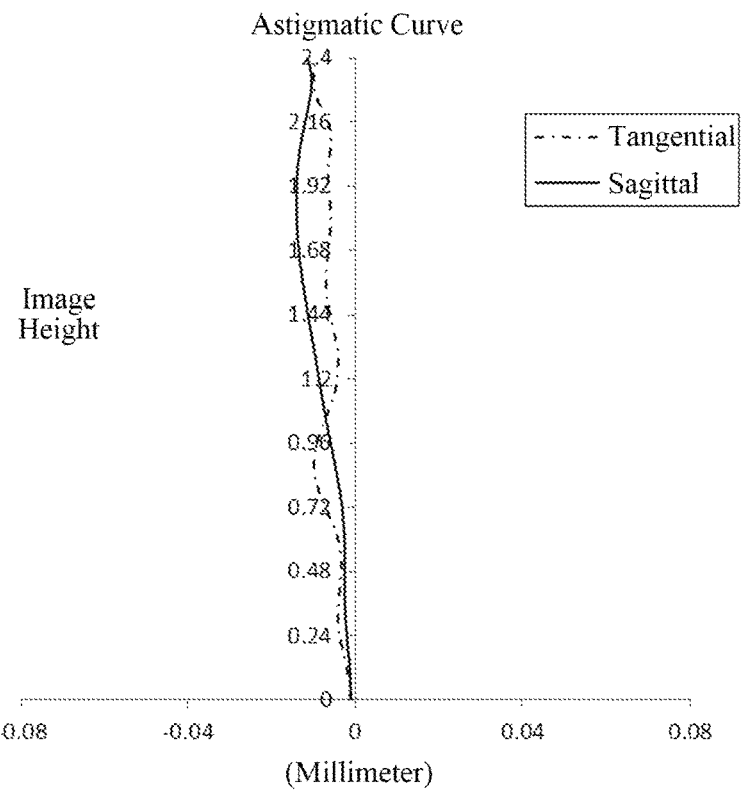
Figure 14C:
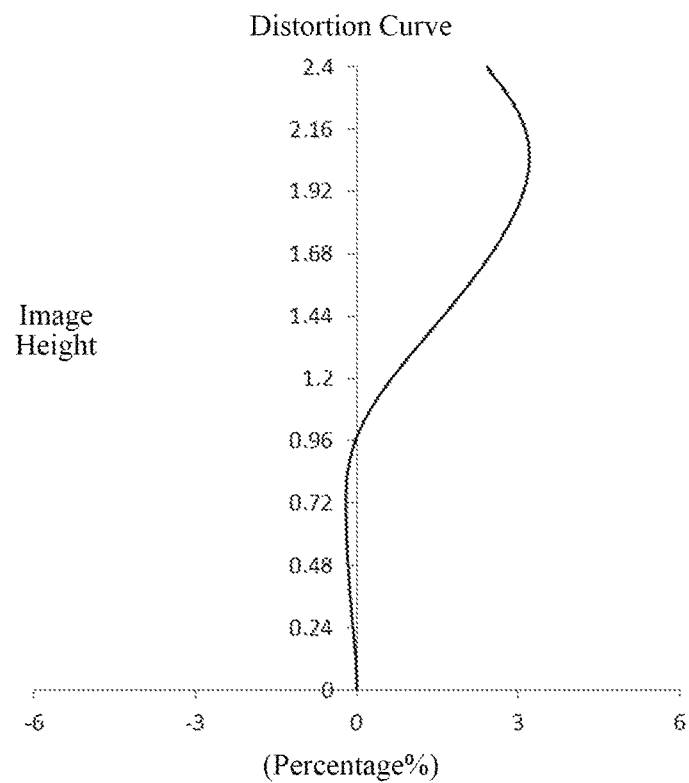
Figure 14D:
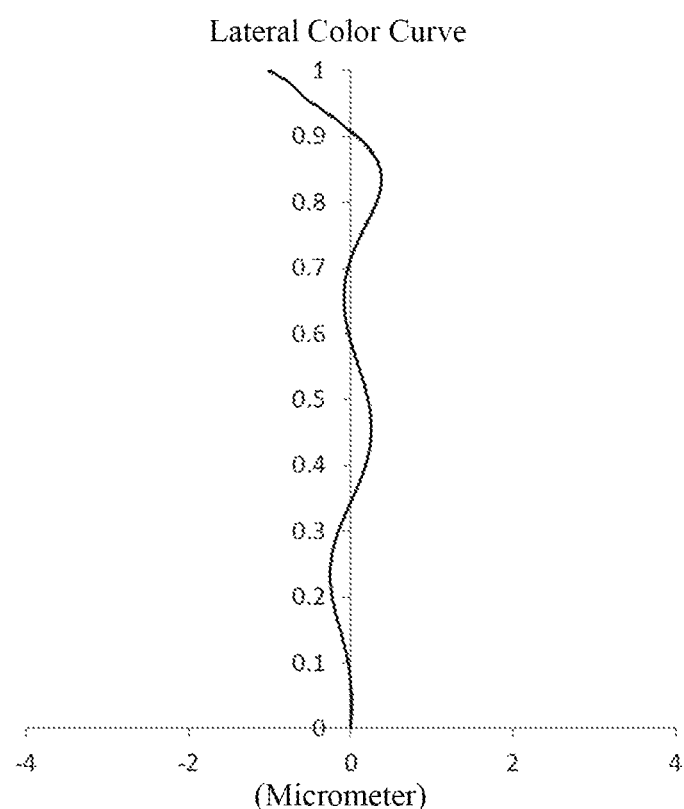

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatism curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different image heights. FIG. 14D illustrates a lateral color curve of the optical imaging lens assembly according to embodiment 7, representing deviations of different image heights on an imaging plane after light passes through the optical imaging lens assembly. It can be seen from FIG. 14A to FIG. 14D that the optical imaging lens assembly provided in embodiment 7 can achieve a good imaging quality.

In view of the above, embodiments 1 to 7 respectively satisfy the relationship shown in Table 22.

TABLE 22

| Formula | Embodiment | | | | | | |
|---|---|---|---|---|---|---|---|
| | 1 | 2 | 3 | 4 | 5 | 6 | 7 |
| HFOV (°) | 23.3 | 23.2 | 23.6 | 23.4 | 23.1 | 23.0 | 23.1 |
| T34/T23 | 3.97 | 3.25 | 5.10 | 7.00 | 6.00 | 5.99 | 3.24 |
| f2/R4 | −1.74 | −1.54 | −2.43 | −1.50 | −1.53 | −1.62 | −1.48 |
| (R2 − R1)/(R2 + R1) | 1.46 | 1.28 | 1.33 | 1.83 | 1.81 | 1.74 | 1.30 |
| f1/CT1 | 2.44 | 2.77 | 2.47 | 2.23 | 2.26 | 2.35 | 2.77 |
| f4/f5 | −1.65 | −1.42 | −1.43 | −1.13 | −1.13 | −1.28 | −1.34 |
| |(R9 + R10)/(R9 − R10)| | 0.63 | 0.71 | 0.48 | 1.00 | 0.48 | 0.25 | 0.80 |
| |(R5 − R8)/(R5 + R8)| | 0.44 | 0.74 | 0.53 | 0.26 | 0.28 | 0.31 | 0.70 |
| f/f123 | 1.13 | 1.25 | 1.07 | 1.00 | 1.01 | 0.99 | 1.25 |
| f/f45 | −0.47 | −0.79 | −0.24 | −0.06 | −0.07 | −0.10 | −0.68 |
| TTL/f | 0.90 | 0.90 | 0.92 | 0.95 | 0.95 | 0.95 | 0.91 |
| CT5/CT4 | 0.51 | 0.45 | 0.72 | 1.15 | 1.17 | 1.38 | 0.49 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising: a first lens, a second lens, a third lens, a fourth lens and a fifth lens, which are sequentially arranged from an object side of the optical imaging lens assembly to an image side of the optical imaging lens assembly along an optical axis of the optical imaging lens assembly, wherein:

the first lens has a positive refractive power, an object-side surface of the first lens is a convex surface and an image-side surface of the first lens is a convex surface;

the second lens has a negative refractive power;
the third lens has a refractive power, and an object-side surface of the third lens is a concave surface;
the fourth lens has a positive refractive power; and
the fifth lens has a negative refractive power, an object-side surface of the fifth lens is a concave and an image-side surface of the fifth lens is a concave surface;
a spaced distance T34 on the optical axis between the third lens and the fourth lens and a spaced distance T23 on the optical axis between the second lens and the third lens satisfy 3≤T34/T23≤7.

2. The optical imaging lens assembly according to claim 1, wherein an effective focal length f2 of the second lens and a radius of curvature R4 of an image-side surface of the second lens satisfy −2.5<f2/R4<−1.4.

3. The optical imaging lens assembly according to claim 1, wherein a radius of curvature R2 of the image-side surface of the first lens and a radius of curvature R1 of the object-side surface of the first lens satisfy 1<(R2−R1)/(R2+R1)<2.

4. The optical imaging lens assembly according to claim 1, wherein an effective focal length f1 of the first lens and a center thickness CT1 on the optical axis of the first lens satisfy 2<f1/CT1<3.

5. The optical imaging lens assembly according to claim 1, wherein a radius of curvature R5 of the object-side surface of the third lens and a radius of curvature R8 of an image-side surface of the fourth lens satisfy |(R5−R8)/(R5+R8)|<0.8.

6. The optical imaging lens assembly according to claim 1, wherein a total effective focal length f of the optical imaging lens assembly and a combined focal length f123 of the first lens, second lens and third lens satisfy 0.5<f/f123<1.5.

7. The optical imaging lens assembly according to claim 1, wherein a radius of curvature R9 of the object-side surface of the fifth lens and a radius of curvature R10 of the image-side surface of the fifth lens R10 satisfy |(R9+R10)/(R9−R10)|≤1.

8. The optical imaging lens assembly according to claim 1, wherein a total effective focal length f of the optical imaging lens assembly and a combined focal length f45 of the fourth lens and the fifth lens satisfy −1<f/f45<0.

9. The optical imaging lens assembly according to claim 1, wherein a center thickness CT5 on the optical axis of the fifth lens and a center thickness CT4 on the optical axis of the fourth lens satisfy 0.4<CT5/CT4<1.4.

10. The optical imaging lens assembly according to claim 1, wherein half of a maximal field-of-view HFOV of the optical imaging lens assembly satisfies HFOV<30°.

11. The optical imaging lens assembly according to claim 1, wherein a distance TTL on the optical axis from the object-side surface of the first lens to an imaging plane of the optical imaging lens assembly and a total effective focal length f of the optical imaging lens assembly satisfy TTL/f≤0.95.

12. An optical imaging lens assembly comprising: a first lens, a second lens, a third lens, a fourth lens and a fifth lens, which are sequentially arranged from an object side of the optical imaging lens assembly to an image side of the optical imaging lens assembly along an optical axis of the optical imaging lens assembly, wherein:
the first lens has a positive refractive power, an object-side surface of the first lens is a convex surface and an image-side surface of the first lens is a convex surface;
the second lens has a negative refractive power;
the third lens has a refractive power, and an object-side surface of the third lens is a concave surface;
the fourth lens has a positive refractive power; and
the fifth lens has a negative refractive power, an object-side surface of the fifth lens is a concave and an image-side surface of the fifth lens is a concave surface;
an effective focal length f1 of the first lens and a center thickness CT1 on the optical axis of the first lens satisfy 2<f1/CT1<3;
a distance TTL on the optical axis from the object-side surface of the first lens to an imaging plane of the optical imaging lens assembly and a total effective focal length f of the optical imaging lens assembly satisfy TTL/f≤0.95.

13. The optical imaging lens assembly according to claim 12, wherein a radius of curvature R2 of the image-side surface of the first lens and a radius of curvature R1 of the object-side surface of the first lens satisfy 1<(R2−R1)/(R2+R1)<2.

14. The optical imaging lens assembly according to claim 12, wherein a radius of curvature R5 of the object-side surface of the third lens and a radius of curvature R8 of an image-side surface of fourth lens satisfy |(R5−R8)/(R5+R8)|<0.8.

15. The optical imaging lens assembly according to claim 12, wherein the total effective focal length f of the optical imaging lens assembly and a combined focal length f123 of the first lens, second lens and third lens satisfy 0.5<f/f123<1.5.

16. The optical imaging lens assembly according to claim 12, wherein a radius of curvature R9 of the object-side surface of the fifth lens and a radius of curvature R10 of the image-side surface of the fifth lens satisfy |(R9+R10)/(R9−R10)|≤1.

17. An optical imaging lens assembly comprising: a first lens, a second lens, a third lens, a fourth lens and a fifth lens, which are sequentially arranged from an object side of the optical imaging lens assembly to an image side of the optical imaging lens assembly along an optical axis of the optical imaging lens assembly, wherein:
the first lens has a positive refractive power, an object-side surface of the first lens is a convex surface and an image-side surface of the first lens is a convex surface;
the second lens has a negative refractive power;
the third lens has a refractive power, and an object-side surface of the third lens is a concave surface;
the fourth lens has a positive refractive power; and
the fifth lens has a negative refractive power, an object-side surface of the fifth lens is a concave and an image-side surface of the fifth lens is a concave surface;
an effective focal length f4 of the fourth lens and an effective focal length f5 of the fifth lens satisfy −2<f4/f5<−1;
a distance TTL on the optical axis from the object-side surface of the first lens to an imaging plane of the optical imaging lens assembly and a total effective focal length f of the optical imaging lens assembly satisfy TTL/f≤0.95.

18. The optical imaging lens assembly according to claim 17, wherein a radius of curvature R2 of the image-side surface of the first lens and a radius of curvature R1 of the object-side surface of the first lens satisfy 1<(R2−R1)/(R2+R1)<2.

19. The optical imaging lens assembly according to claim 17, wherein a radius of curvature R5 of the object-side surface of the third lens and a radius of curvature R8 of an image-side surface of fourth lens satisfy |(R5−R8)/(R5+R8)|<0.8.

20. The optical imaging lens assembly according to claim 19, wherein a radius of curvature R9 of the object-side surface of the fifth lens and a radius of curvature R10 of the image-side surface of the fifth lens satisfy $|(R9+R10)/(R9-R10)| \leq 1$.

* * * * *

UNITED STATES PATENT AND TRADEMARK OFFICE
CERTIFICATE OF CORRECTION

PATENT NO. : 11,385,439 B2
APPLICATION NO. : 16/832892
DATED : July 12, 2022
INVENTOR(S) : Biao Xu It is certified that error appears in the above-identified patent and that said Letters Patent is hereby corrected as shown below:

On the Title Page

Item (30) The Foreign Application Priority Data please insert:
--Jun. 5, 2018 (CN)...................201810570274.2--

Signed and Sealed this
Ninth Day of May, 2023

Katherine Kelly Vidal
*Director of the United States Patent and Trademark Office*